US009931829B2

United States Patent
Yao et al.

(10) Patent No.: US 9,931,829 B2
(45) Date of Patent: Apr. 3, 2018

(54) METHODS AND APPARATUS FOR HYGROMORPHIC SHAPE CONTROL

(71) Applicants: Lining Yao, Cambridge, MA (US); Wen Wang, Revere, MA (US); Jifei Ou, Somerville, MA (US); Chin-Yi Cheng, Cambridge, MA (US); Guanyun Wang, Hangzhou (CN); Hiroshi Ishii, Cambridge, MA (US); Daniel Wang, Newton, MA (US); Helene Steiner, London (GB); Clark Della Silva, San Francisco, CA (US)

(72) Inventors: Lining Yao, Cambridge, MA (US); Wen Wang, Revere, MA (US); Jifei Ou, Somerville, MA (US); Chin-Yi Cheng, Cambridge, MA (US); Guanyun Wang, Hangzhou (CN); Hiroshi Ishii, Cambridge, MA (US); Daniel Wang, Newton, MA (US); Helene Steiner, London (GB); Clark Della Silva, San Francisco, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 150 days.

(21) Appl. No.: 14/927,375

(22) Filed: Oct. 29, 2015

(65) Prior Publication Data
US 2016/0121546 A1    May 5, 2016

Related U.S. Application Data

(60) Provisional application No. 62/072,400, filed on Oct. 29, 2014, provisional application No. 62/149,479, filed on Apr. 17, 2015.

(51) Int. Cl.
*B33Y 80/00* (2015.01)
*B33Y 10/00* (2015.01)
(Continued)

(52) U.S. Cl.
CPC .......... *B33Y 80/00* (2014.12); *B29C 67/0059* (2013.01); *B29C 67/0085* (2013.01); *B33Y 10/00* (2014.12); *B33Y 30/00* (2014.12)

(58) Field of Classification Search
USPC ....................................................... 427/256
See application file for complete search history.

(56) References Cited

U.S. PATENT DOCUMENTS 2,156,244 A * 4/1939 Mahoney ............... D01H 13/30
57/309
2,402,652 A * 6/1946 Martin ................... D06M 15/05
28/179
(Continued)

FOREIGN PATENT DOCUMENTS

CN    101109127 A * 1/2008

OTHER PUBLICATIONS

Chen, X., et al, Bacillus spores as building blocks for stimuli-responsive materials and nanogenerators; published in Nature Nanotechnology 9, 137-141 (2014), Published online Jan. 26, 2014.
(Continued)

*Primary Examiner* — Cachet I Sellman
(74) *Attorney, Agent, or Firm* — Stephen R. Otis

(57) ABSTRACT

A composite film includes a substrate that is not responsive to relative humidity, and also one or more layers of hygromorphic material. The hygromorphic material expands in response to an increase in relative humidity and contracts in response to a decrease in relative humidity. In some cases, the composite film is bi-layer or tri-layer. The composite films are fabricated such that they undergo a desired bending pattern in response to changes in relative humidity. In some cases, these bending patterns are combinations of two bending primitives: a smooth curve and a sharply angled curve. These two primitives are combined to create a variety of shape transformations including 1D linear transformation,
(Continued)

2D surface expansion and contraction, 2.5D texture change and 3D folding. Any type of hygromorphic material may be employed, including living gram positive and gram negative bacterial cells, yeast cells, plant cells, mammalian cells, cell debris, or hydrogel.

9 Claims, 25 Drawing Sheets

(51) Int. Cl.
*B33Y 30/00* (2015.01)
*B29C 67/00* (2017.01)

(56) References Cited

U.S. PATENT DOCUMENTS

| | | | | |
|---|---|---|---|---|
| 3,169,181 A | * | 2/1965 | Kjellman | H01H 35/42 |
| | | | | 235/61 J |
| 3,712,860 A | * | 1/1973 | Gabrusenok | G01N 27/121 |
| | | | | 204/414 |
| 4,481,942 A | * | 11/1984 | Duncan | A61F 13/102 |
| | | | | 128/878 |
| 8,441,761 B1 | * | 5/2013 | Hahn | G11B 5/4833 |
| | | | | 360/245.3 |
| 8,970,989 B1 | * | 3/2015 | Hahn | G11B 5/4833 |
| | | | | 360/245.3 |
| 2013/0285386 A1 | | 10/2013 | Sahin | |

OTHER PUBLICATIONS

Ma, M., et al, Bio-Inspired Polymer Composite Actuator and Generator Driven by Water Gradients; published in Science, vol. 339, Issue 6116, pp. 186-189; Jan. 11, 2013.

Menges, A., Responsive Surface Structure 1; published online at http://www.achimmenges.net/?p=4411 The Wayback Machine captured a snapshot of this webpage on Apr. 17, 2012, so this document was posted online on or before Apr. 17, 2012.

* cited by examiner

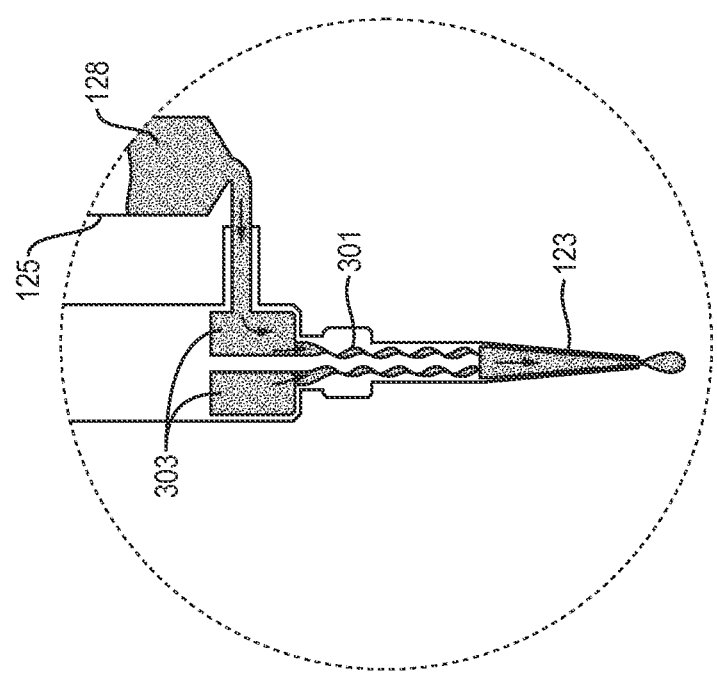
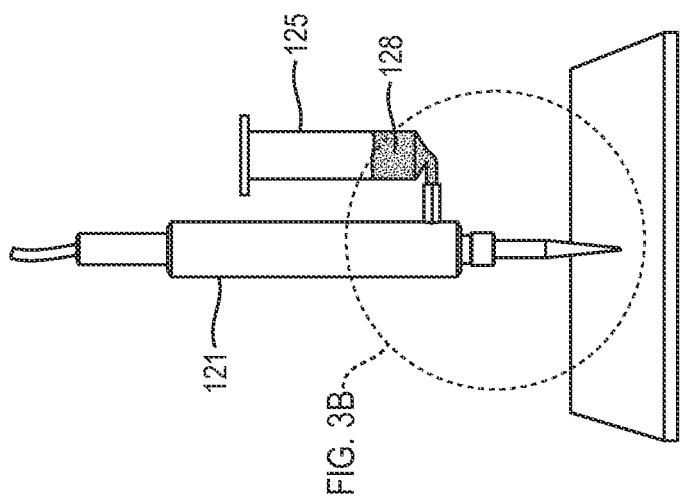

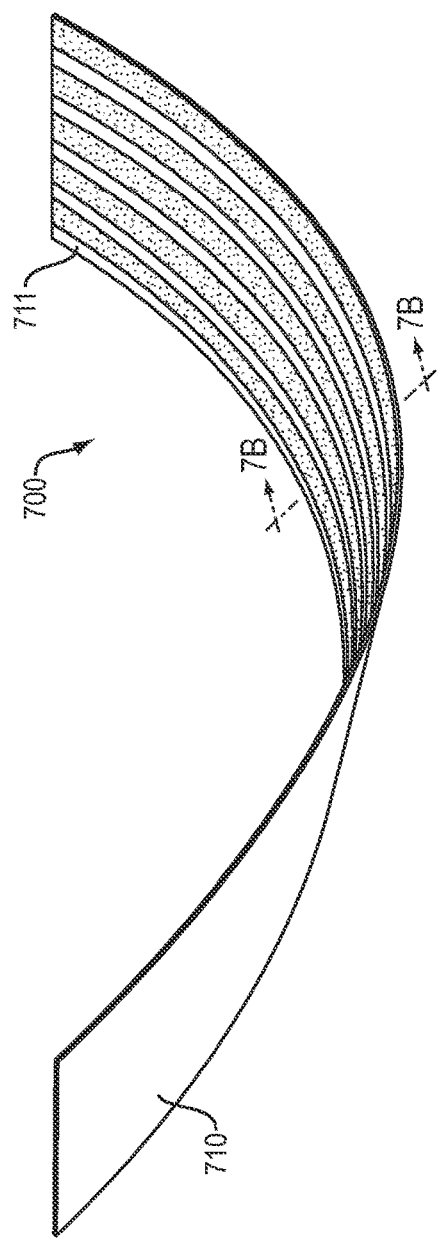
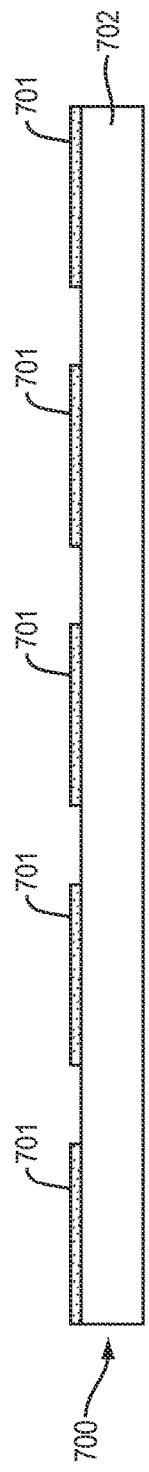
FIG. 7A
FIG. 7B

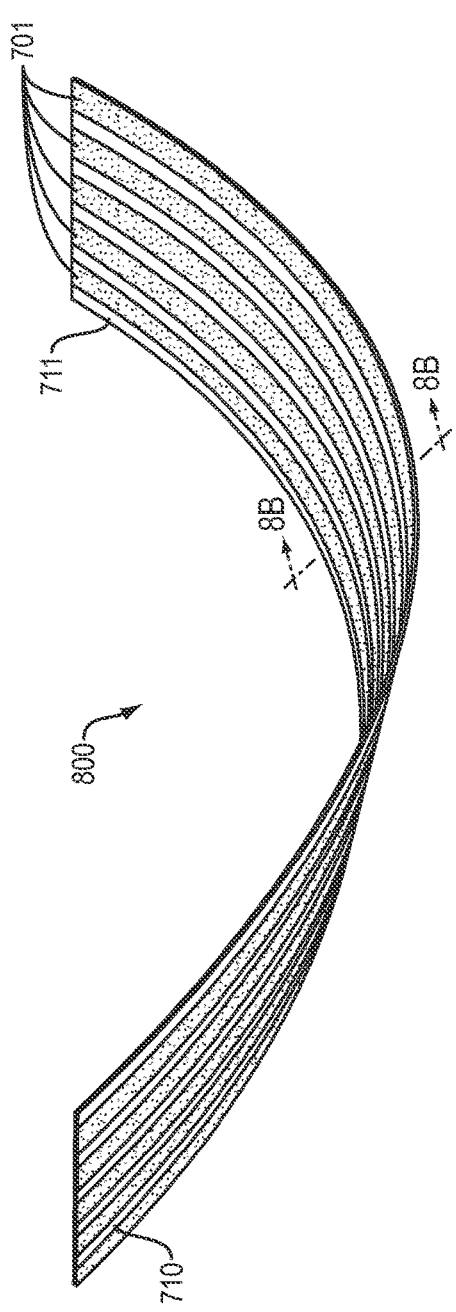
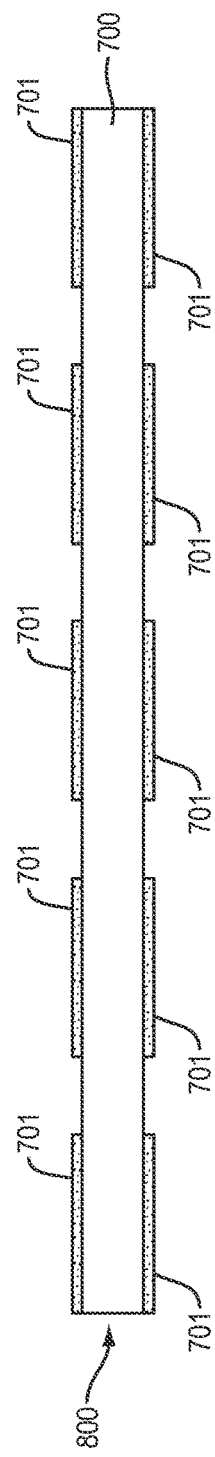
FIG. 8A
FIG. 8B

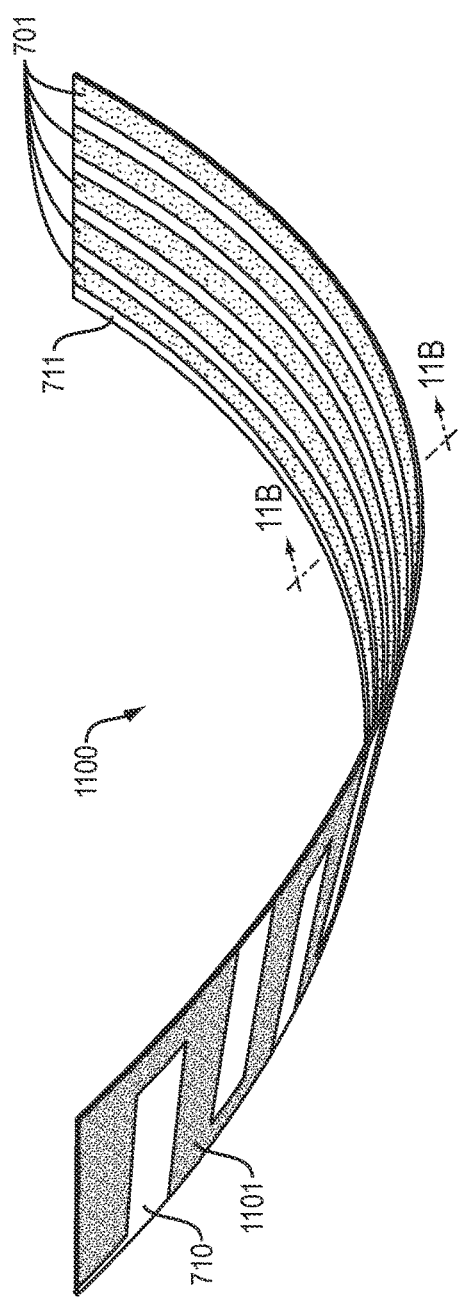
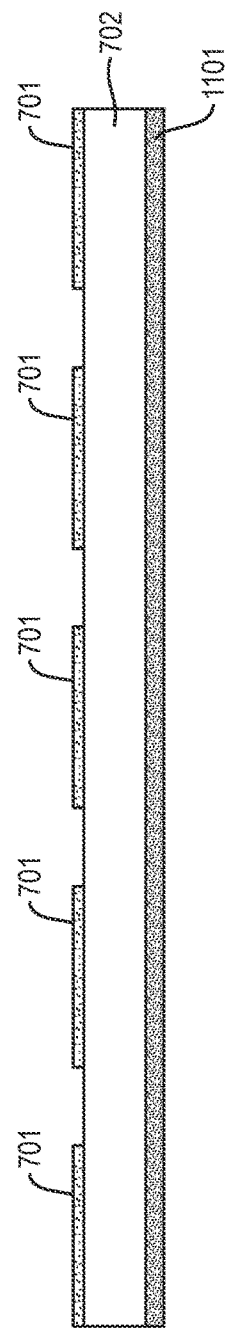
FIG. 11A
FIG. 11B

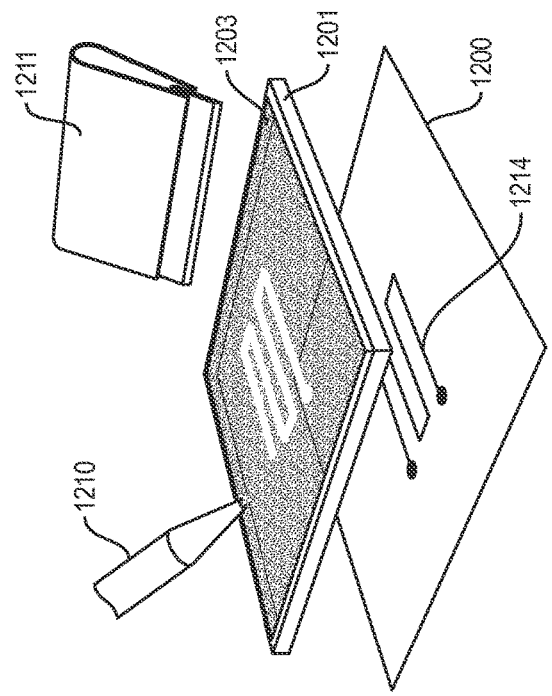
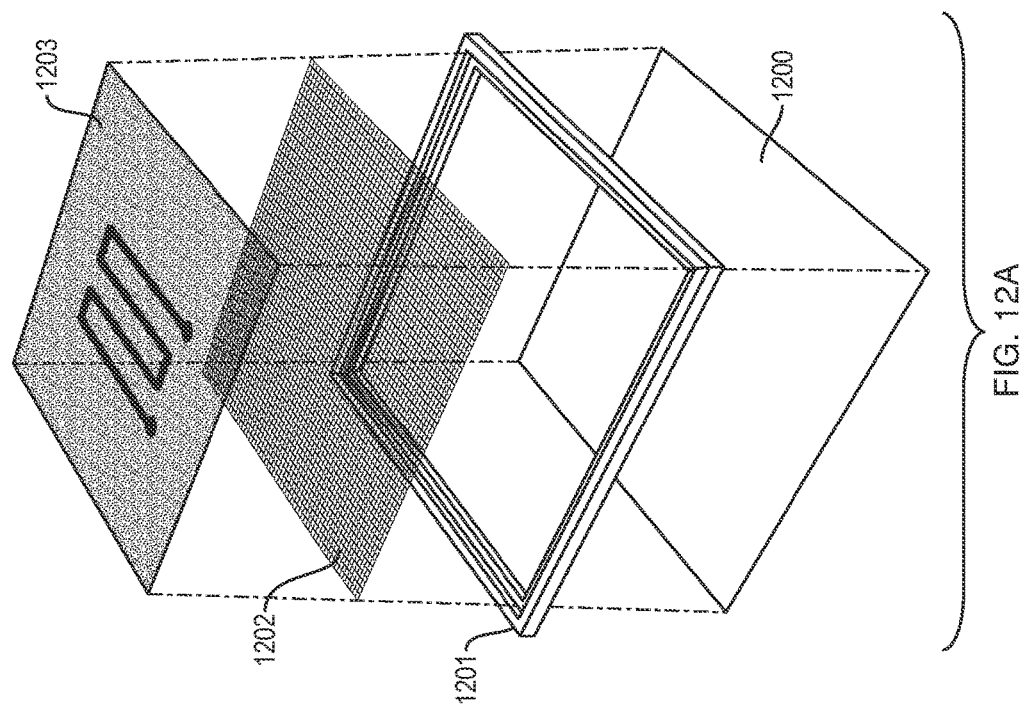

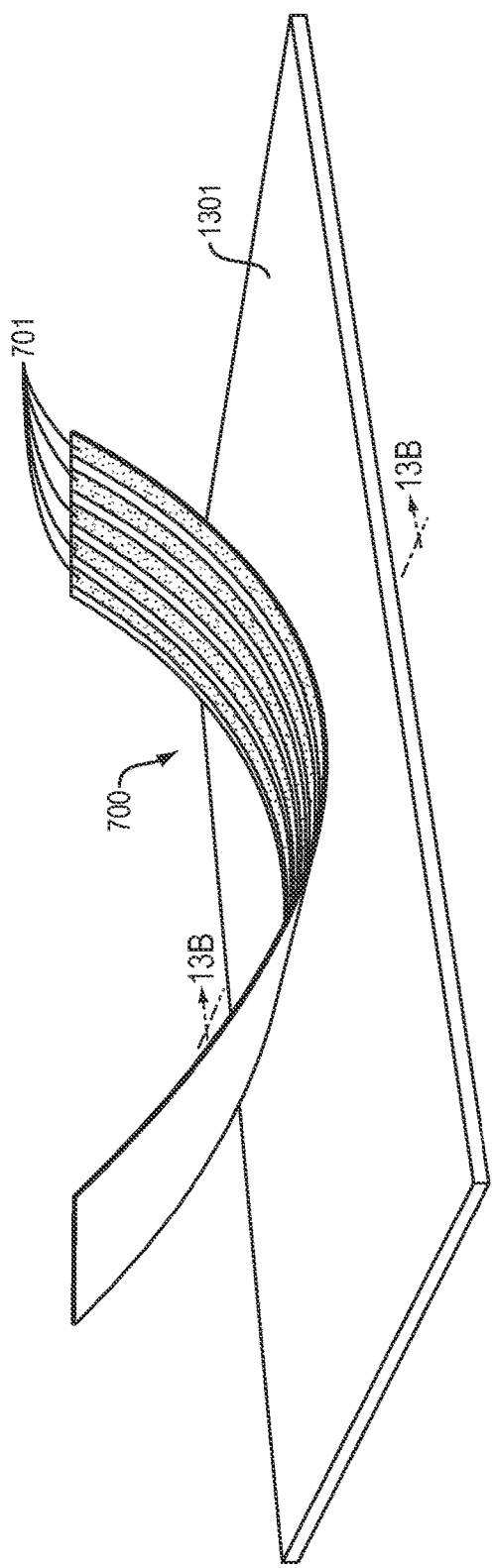
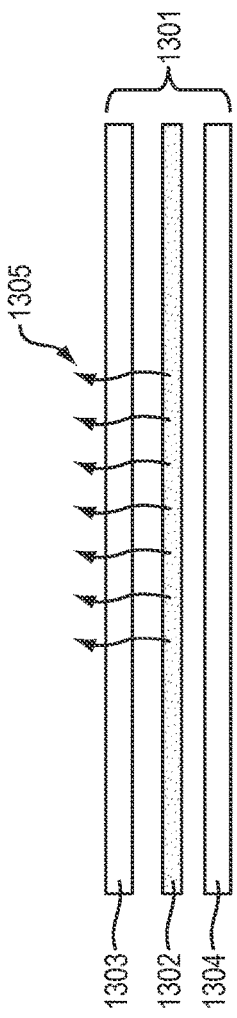
FIG. 13A
FIG. 13B

METHODS AND APPARATUS FOR HYGROMORPHIC SHAPE CONTROL

RELATED APPLICATIONS

This application is a non-provisional of, and claims the benefit of the filing date of, U.S. Provisional Patent Application No. 62/072,400, filed Oct. 29, 2014, and U.S. Provisional Patent Application No. 62/149,479, filed Apr. 17, 2015, the entire disclosures of which are herein incorporated by reference.

FIELD OF TECHNOLOGY

The present invention relates generally to hygromorphic shape control.

SUMMARY

In illustrative embodiments of this invention, a composite film includes: (a) a substrate that is not responsive to relative humidity, and (b) one or more layers of hygromorphic material. The hygromorphic material expands in response to an increase in relative humidity and contracts in response to a decrease in relative humidity.

In some cases, the composite film is bi-layer. The first layer comprises a hygromorphic material. The second layer comprises an elastic or non-elastic, non-moisture responsive film. The default state of the film after deposition is bended (at low relative humidity). The film turns flat when the surrounding relative humidity increases.

In some cases, the composite film is tri-layer. The outer two layers comprise a hygromorphic material. The inner layer comprises an elastic or non-elastic, non-moisture responsive film. The default state of the film is flat in a relative humidity homogenous environment (either at low relative humidity on both sides, or high relative humidity on both sides). The film bends when the two sides are exposed to different relative humidities.

In illustrative embodiments of this invention, the bending orientation of a composite film depends in part on the orientation of the cell deposition. Parallel lines of cell films tend to pull the film such that the film bends along the longitude of the lines.

In some embodiments, composite films are fabricated such that they undergo a particular, desired bending pattern in response to changes in relative humidity. In some cases, this bending pattern is a combination of two bending primitives: a smooth curve and a sharply angled curve.

To achieve a smooth curve, hygromorphic material is applied across an entire side of the substrate. The bending curvature of the smooth curve at a specific relative humidity depends on the relative thicknesses of the hygromorphic layer and substrate layer, the percent of the substrate surface covered by the hygromorphic material, and the type of the hygromorphic material.

To achieve a V-shaped bend (a sharp angular bend), hygromorphic material is applied in a relatively smaller region within the folding lines. A stiffer material may be attached to substrate regions without hygromorphic actuators, to stabilize the structure and enhance the effect of a sharp fold. The bending angle of a V-shaped bend (a sharp angular bend) is determined by the relative thicknesses of the hygromorphic layer and the substrate layer, the percent of the substrate surface covered by the hygromorphic material, and the type of the hygromorphic material. The amount of change in relative humidity needed to reach this bending angle (i.e., the sensitivity of the bending response) depends on the thickness of the deposited hygromorphic layer and substrate layer.

In illustrative embodiments of this invention, these two bending primitives (smooth curve and V-shaped sharp angular bend) are combined to create a variety of shape transformations including 1D linear transformation, 2D surface expansion and contraction, 2.5D texture change and 3D folding. In illustrative embodiments of this invention, these shape transformations are actuated by expansion and contraction of hygromorphic material in response to changes in relative humidity.

In illustrative embodiments of this invention, a liquid deposition modeling printer (or other 3D printer) deposits liquid to create or add to composite film. The liquid includes hygromorphic material. There are several ways to solidify the liquid. First, moisture evaporates from the deposited material, causing the material to solidify. Second, mixing hygromorphic material with UV curable materials. UV radiation causes the material to solidify. Third, mixing hygromorphic material with chemical reactive components. Chemical reactions, such as in situ gelation due to chemical relation cause the material to solidify.

In illustrative embodiments, an LDM printer applies hygromorphic material to a first side of an object, such that the amount of the hygromorphic material that adheres to the first side varies substantially from region to region of the first side. In some cases, the LDM printer also applies hygromorphic material to a second side of an object, such that the amount of the hygromorphic material that adheres to the second side varies substantially from region to region of the second side.

Any type of hygromorphic material may be employed. For example, the hygromorphic material may comprise intact cells and cell debris from any type of gram positive or gram negative bacterial cells (including vegetative cells and endospores), fungi cells (including yeast cells), mammalian cells, hydrogels, or cellular components including protein, DNA, carbohydrate (including polysaccharide) or their mixtures.

In illustrative embodiments, one or more heaters (temperature) and humidifiers (moisture) adjust relative humidity (function of both temperature and moisture) ambient to the composite film, and thus cause a change in shape of the film. The change of shape follows a bending pattern that depends, at least in part, on the distribution of the hygromorphic material on the first side and (if applicable) the second side of the layer. In some cases, the humidifier comprises a bubbler that blows moist pressurized air over the composite film, in order to raise relative humidity. In some cases, the heater comprises a conductive ink that is part of the composite film and that heats the film by resistive heating, thereby causing relative humidity to decrease.

In some cases, the composite film or thread or 3D shaped object is formed by solidifying the liquid mixture containing liquid inert substrate precursor, hygromorphic material and other functional objects. For example, these other objects may include magnetic nanoparticles, nanowires, thermoreactive ink or chemicals, or sensors.

The description of the present invention in the Summary and Abstract sections hereof is just a summary. It is intended only to give a general introduction to some illustrative implementations of this invention. It does not describe all of the details and variations of this invention. Likewise, the descriptions of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

FIG. 2A shows a micro-extrusion dispenser and a gravity-feed solution container attached to the substrate. This dispenser and container are also attached to the substrate in FIGS. 2B-2F.

FIG. 2B shows a ventilation module attached to the substrate.

FIG. 2C shows a closed container attached to the substrate. The container stores higher-viscosity solutions that are dispensed under pneumatic pressure.

FIG. 2D shows a UV curing lamp attached to the substrate.

FIG. 2E shows a webcam attached to the substrate.

FIG. 2F shows a stirring device attached to a solution container.

FIG. 3A shows a micro-extrusion dispenser and a gravity-feed solution container.

FIG. 3B is a cross-section of a portion of the dispenser shown in FIG. 3A.

FIG. 7A shows a bi-layer composite film, comprising a substrate and hygromorphic material applied to one side of the substrate.

FIG. 7B shows a cross-section of the bi-layer film in FIG. 7A.

FIG. 8A shows a tri-layer composite film, comprising a substrate and hygromorphic material applied to both sides of the substrate.

FIG. 8B shows a cross-section of the tri-layer film in FIG. 8A.

FIG. 11A and FIG. 11B show a composite film with a conductive trace. FIG. 11A is a perspective view; FIG. 11B is a cross-section view.

FIG. 12A shows an exploded view of a mask system for selectively applying conductive ink.

FIG. 12B shows conductive ink being applied to a substrate.

FIG. 13A shows a heating panel for heating a composite film.

FIG. 13B shows a cross-section of the heating panel.

In FIG. 14A and FIG. 14B, the bending primitive is a smooth curve.

In FIG. 14C and FIG. 14D, the bending primitive is V-shaped.

In FIG. 14G and FIG. 14, the transformation is to and from an accordion-like shape.

In FIG. 14Q, FIG. 14R, FIG. 14S, FIG. 14T, FIG. 14U and FIG. 14V, the transformation is to and from folded 3-D object.

FIG. 15A and FIG. 15B show hygromorphically-actuated expansion and contraction of a portion of a single thread.

FIG. 15C and FIG. 15D show hygromorphically-actuated expansion and contraction of plain-woven threads.

FIG. 15E and FIG. 15F show hygromorphically-actuated expansion and contraction of spiral loops of a thread.

FIG. 15G and FIG. 15H show hygromorphically-actuated expansion and contraction of a lower region of a thread, causing the thread to bend in a "V".

FIG. 15I, 15J and FIG. 15K show hygromorphically-actuated expansion and contraction of lower regions of plain-woven threads, causing the plain weave to bend.

In FIGS. 16A, 16C, 16E, 16G, humidity is higher and cells are in an expanded state. In FIGS. 16B, 16CD, 16F, 16H, humidity is lower and cells are in a contracted state.

The above Figures show some illustrative implementations of this invention, or provide information that relates to those implementations. However, this invention may be implemented in many other ways.

DETAILED DESCRIPTION

Fabrication of Hygromorphic Structures

In illustrative embodiments of this invention, a liquid deposition modeling (LDM) 3D printing platform prints materials in liquid solution to produce either 2D or 3D hygromorphic structures.

In illustrative embodiments, printable materials range from synthesized polymers to living cells. The printing platform has a magnetic-assembly-based modular design. The modularized parts may be easily and precisely reconfigured and aligned to meet different material requirements for solidification, such as mechanical mixing, chemical reaction, light activation and solution vaporization. In addition, the printing platform supports an open-source, customizable software design and simulation platform. Parametric tools are employed to offset 1D lines, fill 2D surfaces or slice 3D models. The printing platform has a large range of printing resolution with droplet width from 10 μm up to 5 mm, due to its central progressive cavity pump based dispenser that used as an extruder.

In illustrative embodiments, the micro-extrusion LDM printer system includes a standard 3-axis CNC platform, two mounting substrates for attaching modular components, and a controller.

Figure 1:
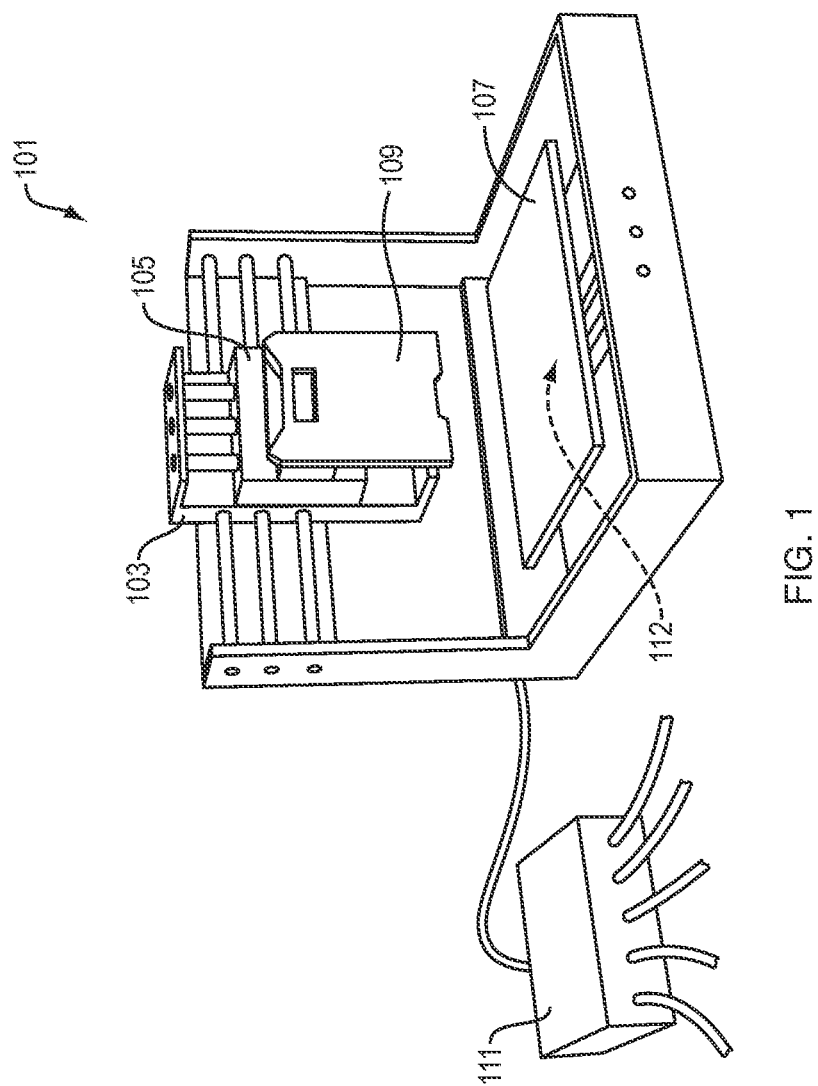
FIG. 1 shows a 3-axis CNC positioning system, with two substrates for attachment of modular components.

FIG. 1 shows a 3-axis CNC positioning system 101 for an LDM 3D printer, in an illustrative embodiment of this invention. The positioning system 101 includes two substrates 105, 107 for attachment of modular components of the printer. The positioning system also includes three movable stages: stage 103 for x-axis movement, stage 105 for z-axis movement, and stage 112 for y-axis movement. The positioning system 101 includes actuators (occluded from view in FIG. 1) for movement of these three movable stages. A controller 111 controls the positioning system 101. For example, in some cases, the controller 111 controls up to 5 one-axis stepper motor, and includes 5 input ports and 5 extra output ports to accept signals and send commands to the modular components.

FIGS. 2A-2F show a substrate of the positioning system, with different modular components attached to the substrate, in illustrative embodiments of this invention. The modularized parts may be reconfigured to meet different material requirements for solidification, such as mechanical mixing, chemical reaction, light activation and solution vaporization.

In illustrative embodiments of this invention, the LDM 3D printer has modules that may be easily added to or removed from the printer for different use scenarios. To facilitate the addition and removal of modules, the two mounting substrates include magnets. For example, mounting substrate 109 includes at least five magnets 131, 133, 135, 137, 139. The modules that are attached to the mounting substrate 109 also have magnets. Thus, the modules may be easily held in place, relative to mounting substrate 109, by magnetic attraction between magnets. The magnets and modules are configured such that attachment for a given module is in the same position relative to mounting substrate 109, each time that the given module is attached.

Figure 2A:
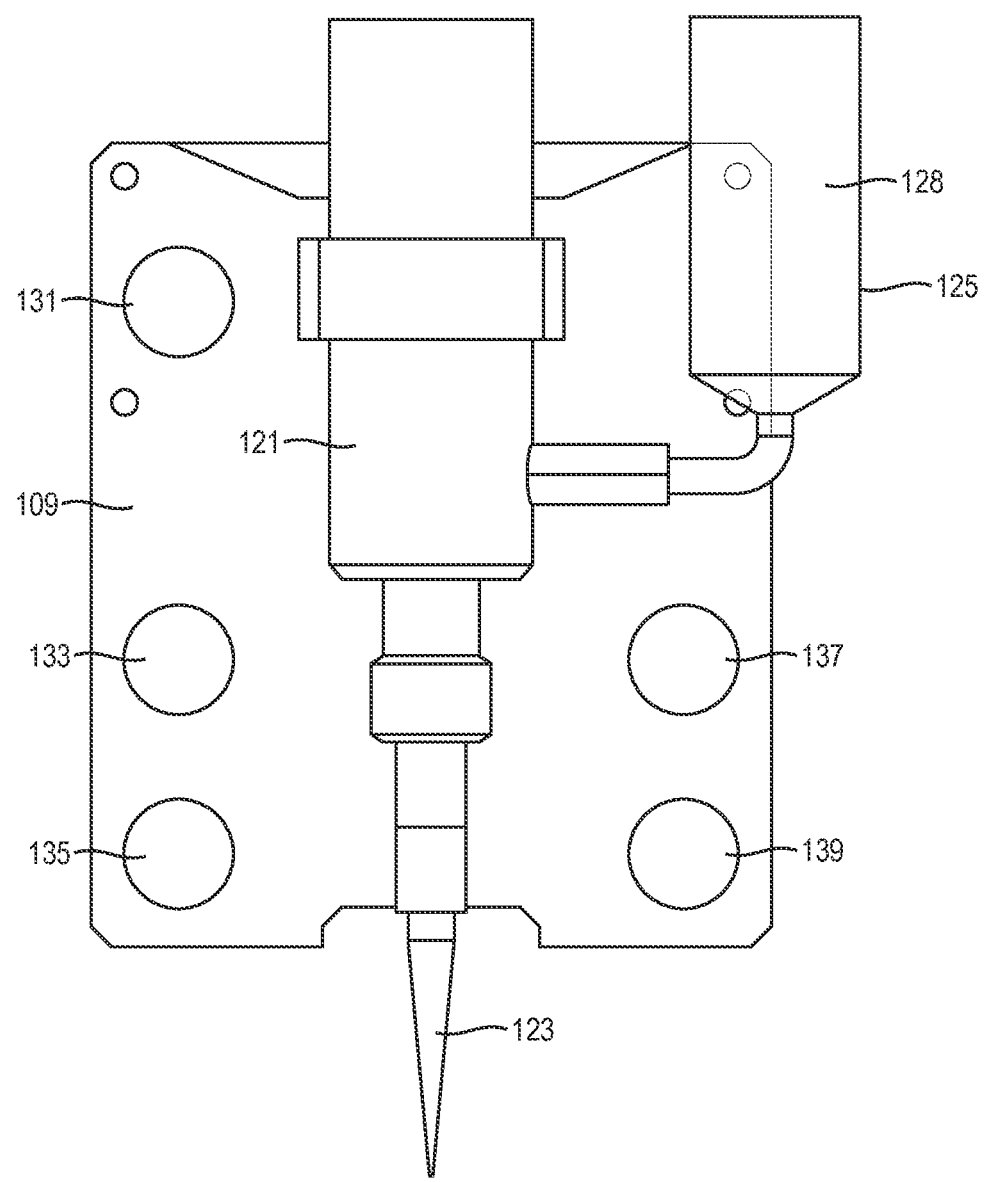
FIGS. 2A-2F show a substrate of the positioning system, with different modular components attached to the substrate.

FIG. 2A shows a micro-extrusion dispenser 121 and a gravity-feed solution container 125 attached to the substrate. This dispenser 121 and container 125 are also attached to the substrate in FIGS. 2B-2F.

Dispenser 121 is a progressive cavity pump based dispensing head. In some cases, dispenser 121 produces droplet widths between 10 μm up to 5 mm. The dispenser 121 is controlled by the controller 111. The controller 111 may, among other things, turn on and off the dispenser.

In illustrative embodiments, the LDM system has two types of solution containers. A liquid (e.g., 128) that flows quickly with its own gravity may be loaded into gravity based container 125 without a cap. However, for solutions (e.g., 145) with higher viscosity, closed container 144 (FIG. 2C) with controllable pneumatic pressure is used.

Figure 2B:
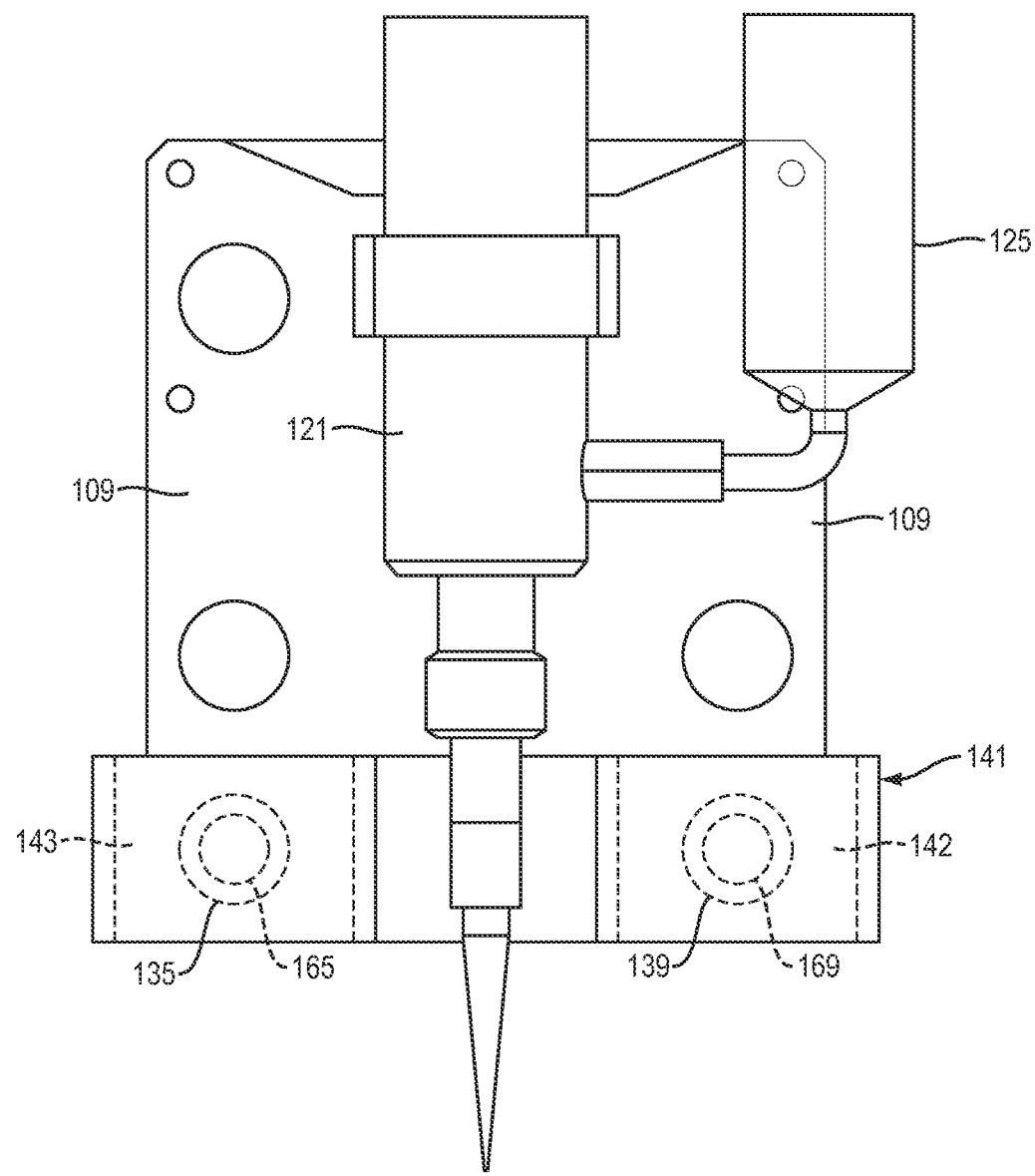

FIG. 2B shows a ventilation module 141 attached to a mounting substrate. In the example shown in FIG. 2B, the ventilation module 141 includes two speed-tunable fans 142, 143. The fans circulate air over the liquid that is deposited by the LDM printer, in order to facilitate evaporation of liquid and solidifying of the deposited material. Magnets 165, 169 in the ventilation module magnetically attach to magnets 135, 139 in mounting substrate 109.

Figure 2C:
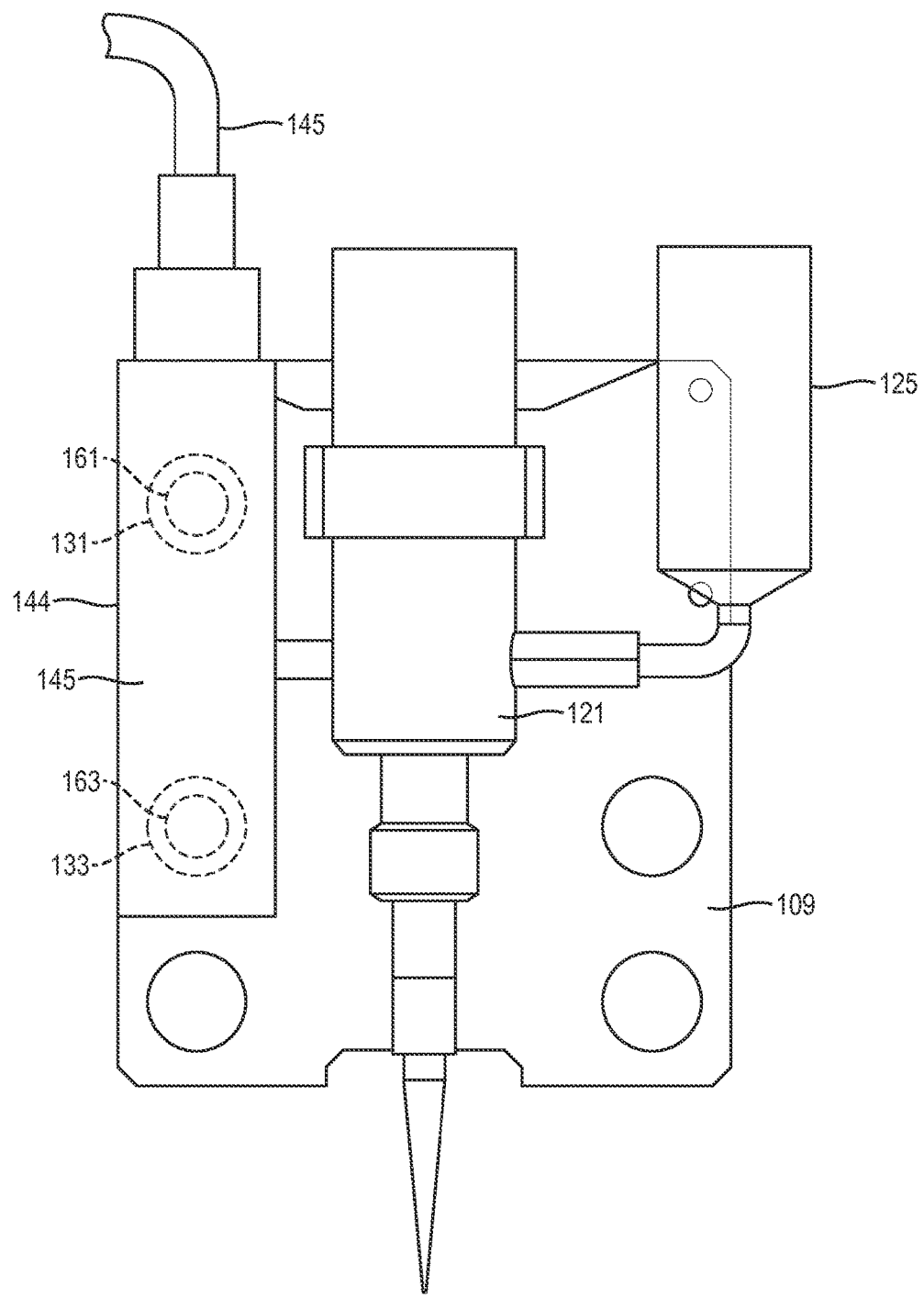

FIG. 2C shows a closed container 144 attached to a mounting substrate. The container 144 stores a higher-viscosity solution 145 that is dispensed under pneumatic pressure. Pressurized air is supplied to closed container 144 via a pneumatic tube 145. Magnets 161, 163 in container 141 attach to magnets 131, 133 in mounting substrate 109.

Figure 2D:
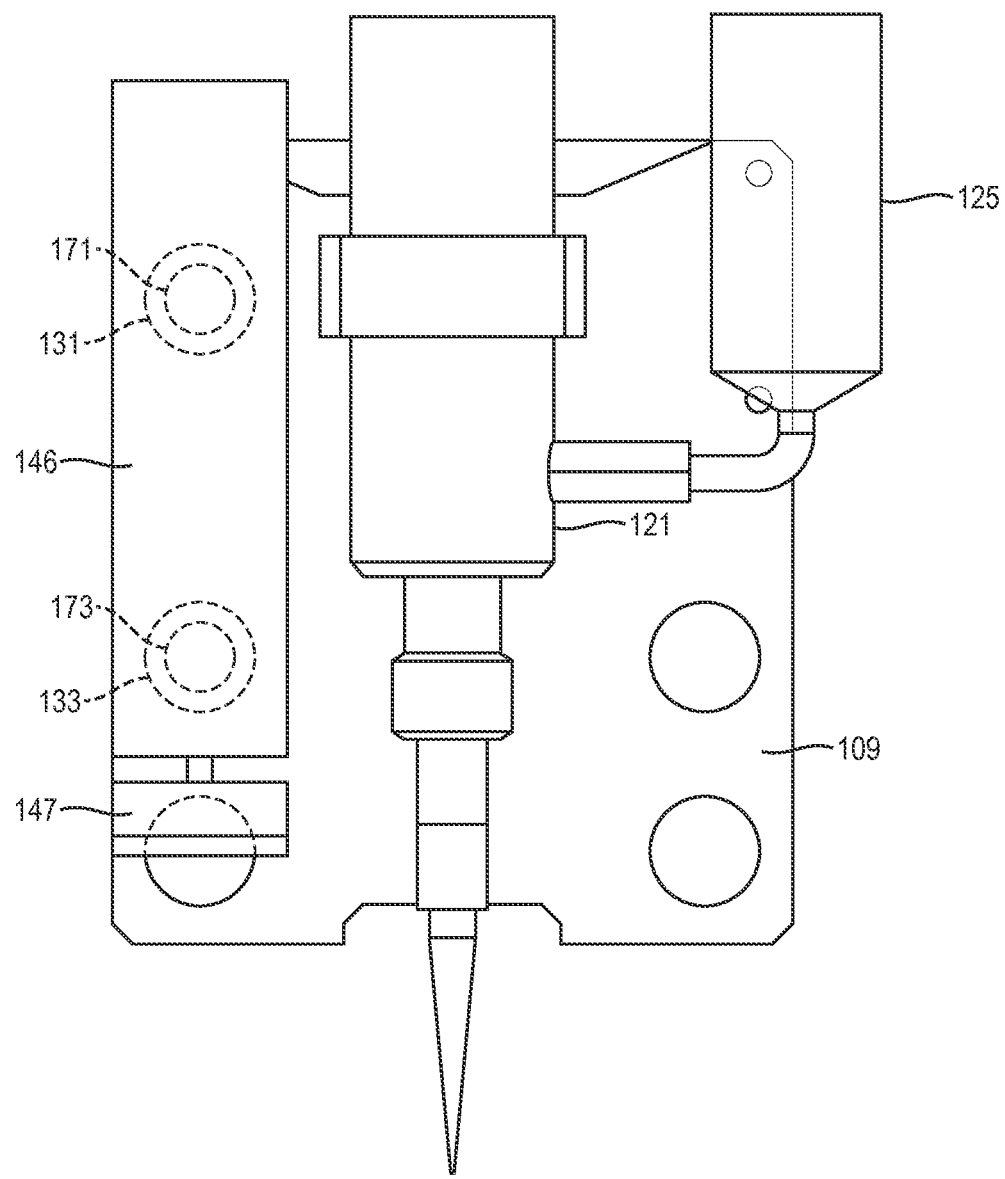

FIG. 2D shows a UV (ultra-violet light) curing lamp 146 attached to mounting substrate 109. The UV curing lamp 146 emits UV light for curing certain liquids, such as resins, that are deposited by the LDM printer in some cases. A mirror assembly 147 guides the UV light emitted by lamp 146. Magnets 171, 173 in the UV lamp attach to magnets 131, 133 in mounting substrate 109.

Figure 2E:
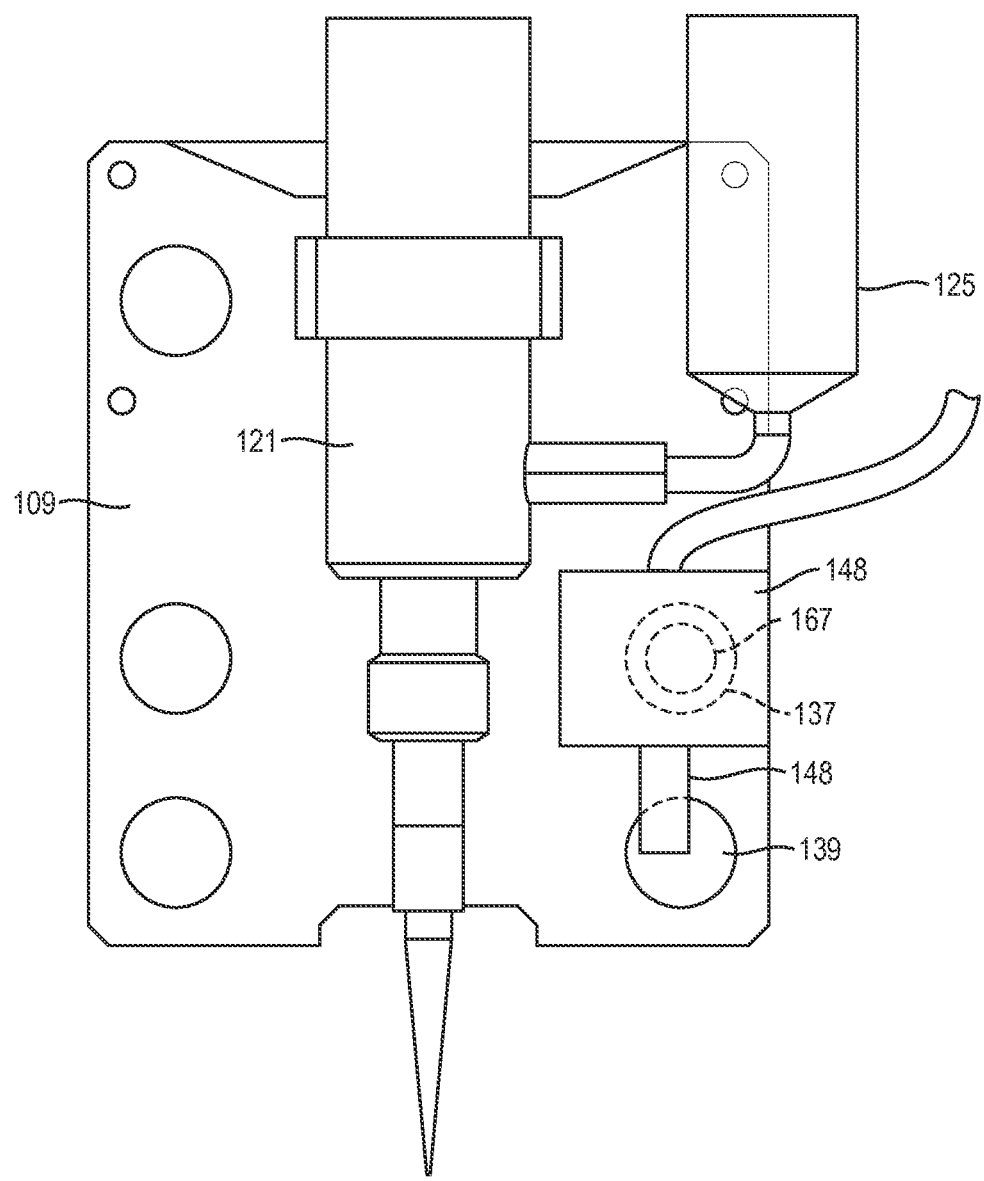

FIG. 2E shows a webcam 148 attached to a mounting substrate. In some cases, a video feed recorded by the webcam 148 is processed in order to: (a) remotely track printing progress; or (b) detect an object and set that object as the starting point of a printing path. Magnet 167 in the webcam attaches to magnet 137 in mounting substrate 109.

Figure 2F:
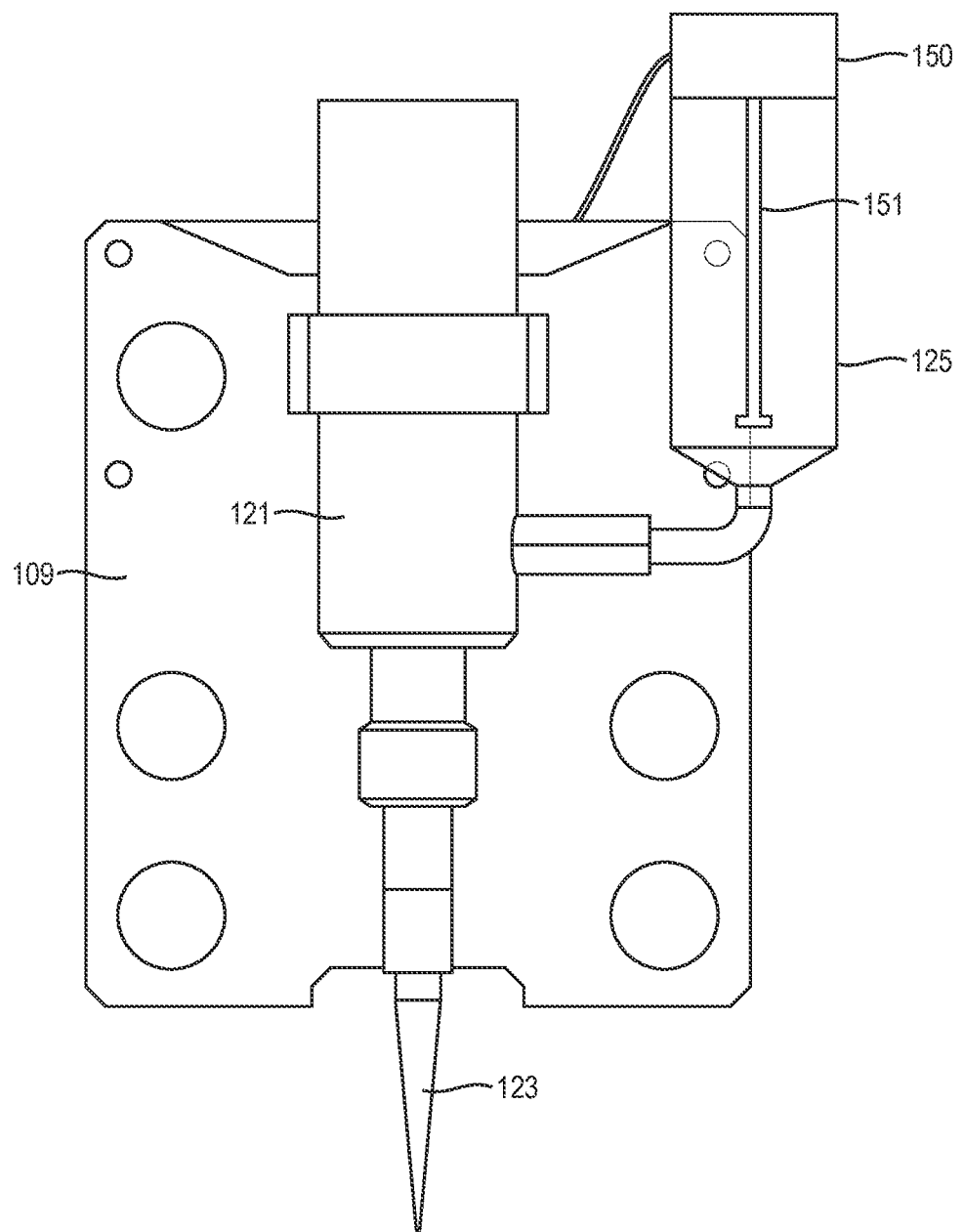

FIG. 2F shows a stirring device attached to a solution container. The stirring device comprises an actuator (e.g., electric motor) 150 and a stirring rod/blade 151. The stirring device is use to prevent sedimentation in the container. For example, the stirring device may be used to stir a solution containing living cells that would otherwise sediment out of the solution.

FIG. 3A shows micro-extrusion dispenser 121 and a gravity-feed solution container 125, in an illustrative embodiment of this invention. The solution in container 125 is a low viscosity liquid 128 that flows out of container 125 by gravity feed.

FIG. 3B is a cross-section of a portion of the dispenser shown in FIG. 3A. As shown in FIG. 3B, a liquid solution 128 flows from container 125 into a cavity 303 in dispenser 121, then through a progressive cavity pump 301, and then through a nozzle 123.

Figure 4B:
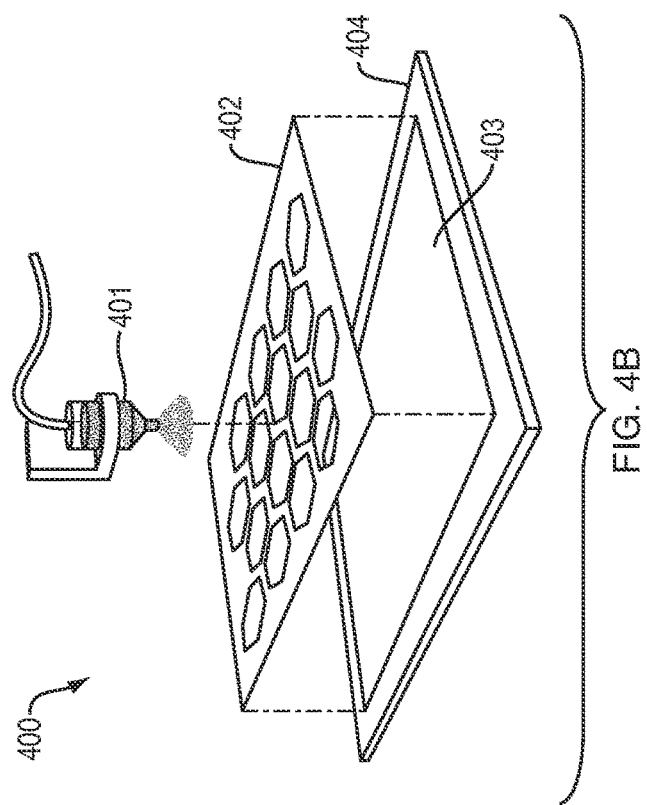
FIG. 4B is an exploded view of the atomizer system.
Figure 4A:
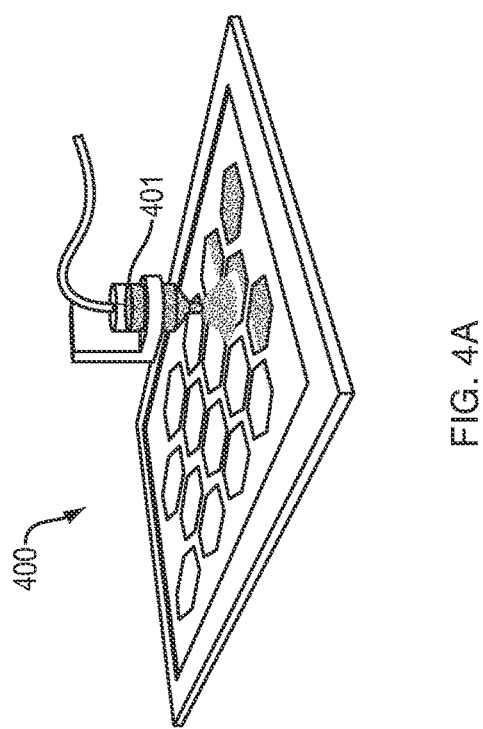
FIG. 4A shows an atomizer system.

FIG. 4A shows an atomizer system 400, in an illustrative embodiment of this invention. FIG. 4B is an exploded view of the atomizer system. An atomizer 401 is moved by a 3-axis positioning system. The atomizer sprays an atomized mist of a liquid solution that contains hygromorphic materials. In order to use the atomizer system 400 for patterned deposition on a substrate 403, a mask 402 is placed over the substrate 403. The atomizer deposits hygromorphic material on exposed (un-masked) regions of substrate 403. For example, the substrate 403 may comprise a latex film. A frame 404 holds mask 402 and substrate 403 in position.

Figure 5:
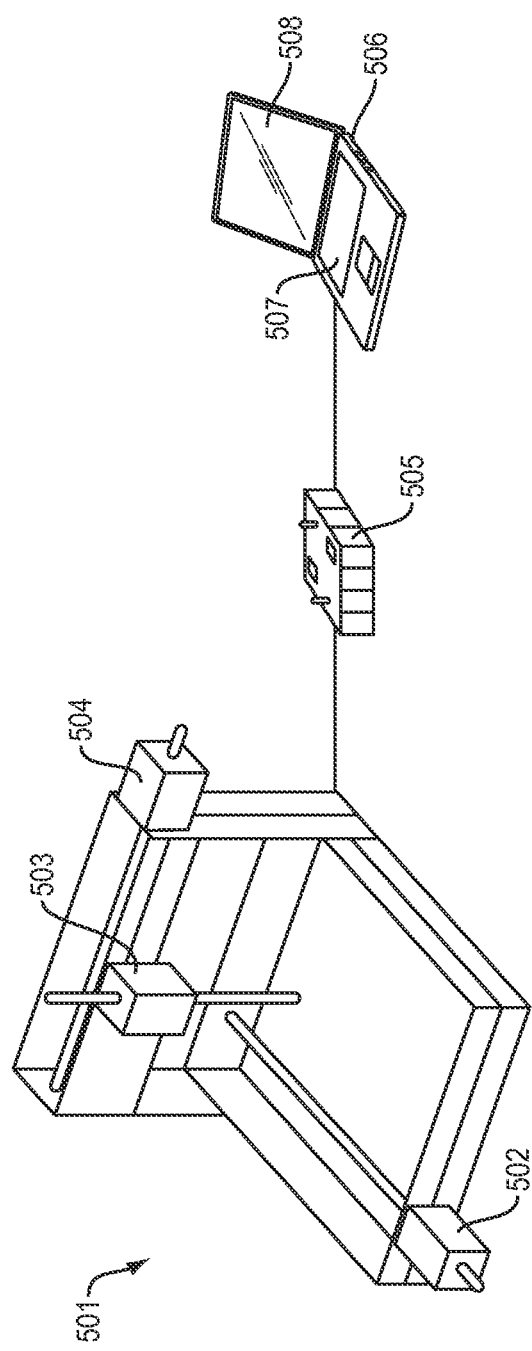
FIG. 5 shows another example of a 3-axis positioning system with control modules.

FIG. 5 shows another example of a 3-axis positioning system 501, in an illustrative embodiment of this invention. The positioning system includes actuators 502, 503 and 504 for actuating movement along an x-axis, z-axis and y-axis, respectively. A microcontroller 505 controls the actuators and thus movement of a 3D inkjet printer that is mounted on, and translated by, the actuators. The microcontroller 505 is in turn controlled by computer 507. A keyboard 506 and touch electronic display screen 508 are employed for input/output from and to a user. Alternatively or in addition, other I/O devices may be employed.

In some embodiments, the liquid solution containing hygromorphic material has a low viscosity, such that it is well-suited by being deposited by an inkjet printhead.

Figure 6A:
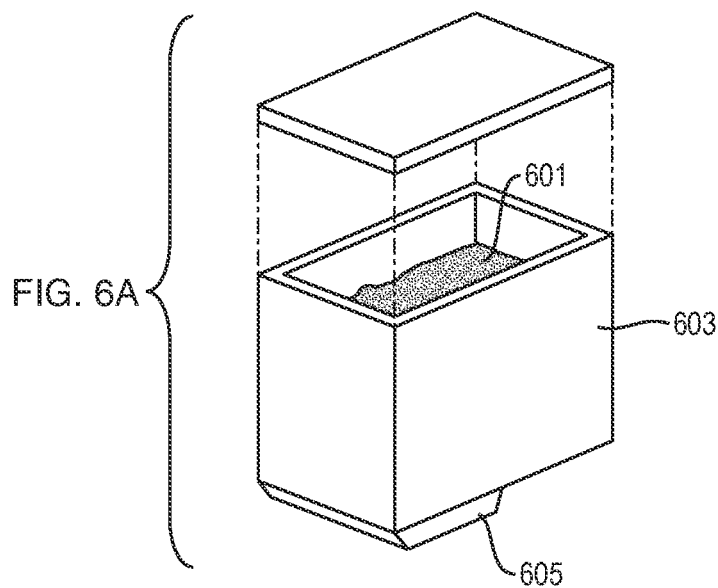
FIG. 6A shows a modified inkjet cartridge for storing cell solution.

FIG. 6A shows a modified inkjet cartridge 603 for storing cell solution 601, in an illustrative embodiment of this invention. For example, the cell solution 601 may comprise endospores in solution. An inkjet printhead 605 prints the cell solution. For example, in some cases, the cartridge has 12 nozzles that may be individually controlled. To replace the ink in the original cartridge with spore solution, the top cap of the cartridge is removed. Then the cartridge and the sponge inside are washed. After they completely dried, a 5 mL spore solution is poured into the cartridge and soaks the sponge inside the cartridge. The top cap is reattached (e.g., with tape) to the cartridge body. In some cases, an ultrasonic cleaner is used to clean the nozzles of cartridge when the nozzles become blocked by impurities.

Figure 6B:
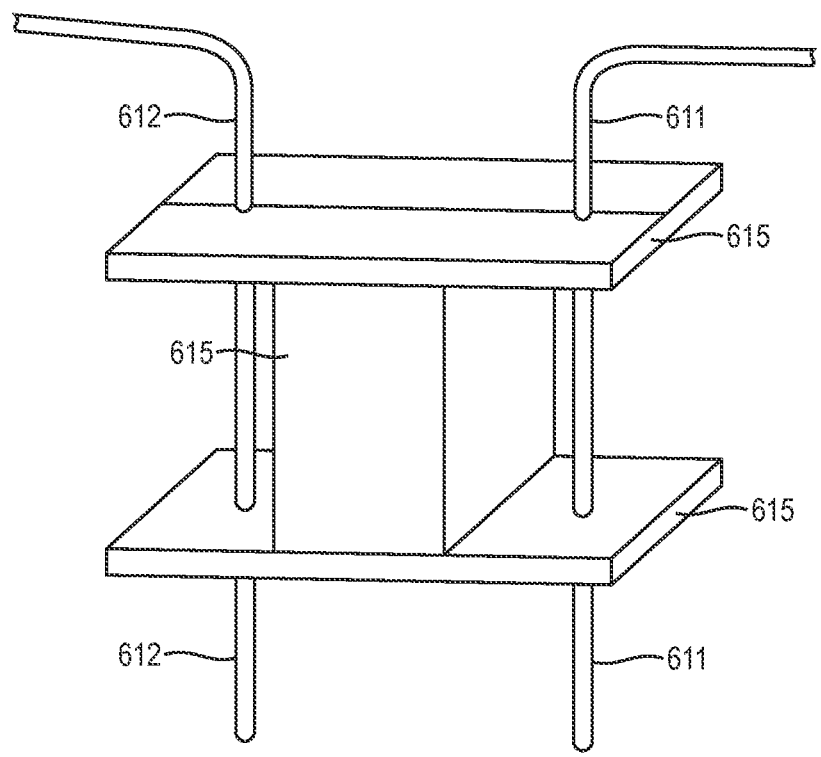
FIG. 6B shows a support structure for pneumatic tubing.

FIG. 6B shows a support structure for pneumatic tubing, in an illustrative embodiment of this invention. Two pneumatic tubes 611, 612 that connect to the inkjet cartridge (or other pneumatic dispenser, such as 144) are supported by a rigid (e.g., acrylic) structure 615 with four holes. This support structure ensures that the tubing remains at the same position when applying pneumatic pressure into a cartridge or other container that holds the solution to be deposited.

Composite Film

In illustrative embodiments of this invention, a composite film includes a hygromorphic material that changes shape in response to changes in relative humidity.

In some cases, the composite film is bi-layer (i.e., comprises two layers). The first layer comprises a hygromorphic material (e.g., cells). The second layer comprises an elastic or non-elastic, non-moisture responsive film. The default state of the film after deposition is bended (at low relative humidity). The film turns flat when the surrounding relative humidity increases.

FIG. 7A shows a bi-layer composite film 700 in an illustrative embodiment of this invention. FIG. 7B shows a cross-section of the bi-layer film in FIG. 7A.

In FIGS. 7A and 7B, the bi-layer film 700 comprises a substrate 702 and hygromorphic material 701 that is selectively applied to portions of only one side 711 of substrate 702. Hygromorphic material 701 is not applied to the other side 710 of the substrate. The substrate 702 is not responsive to relative humidity. The bi-layer composite film is curved in normal room conditions (about RH 50%). The curve is induced by the stress from the cell contraction during dehydration process. To ensure a constant bending direction, cells are deposited as thin lines on the substrate.

In some cases, the composite film is tri-layer. The outer two layers comprise a hygromorphic material. The inner layer comprises an elastic or non-elastic, non-moisture responsive film. The default state of the film is flat in a relative humidity homogenous environment (either at low relative humidity on both sides, or high relative humidity on both sides). The film bends when the two sides are exposed to different relative humidities. The side exposed to lower relative humidity will induce the bending due to a higher degree of cell contraction resulting in contractile force.

FIG. 8A shows a tri-layer composite film, comprising a substrate and hygromorphic material applied to both sides of the substrate, in an illustrative embodiment of this invention. FIG. 8B shows a cross-section of the tri-layer film in FIG. 8A. The two outer layers comprise hygromorphic material (same type or different types) 701. The inner layer comprises a substrate 702 that is not responsive to relative humidity. When the two sides are exposed to the same environmental relative humidity, the tri-layer film 800 is flat by default. If one side is exposed higher relative humidity, the tri-layer film 800 curves to the opposite side with low relative humidity. In some cases, the substrate 702 comprises: (a) 0.2 mm thick latex; or (b) 0.3 mil Kapton® (a polyimide film), or (c) 0.3 mil PET (polyethylene terephthalate).

Alternatively, in some cases, a film has a homogeneous composition, comprising a hygromorphic material mixed with an elastic or non-elastic, non-moisture responsive materials. The default state of the film after deposition is either flat or bended with a 3D shape (at low relative humidity). The film will further bend to the opposite side of which exposes to high relative humidity due to swelling of the hygromorphic material.

Figure 9:
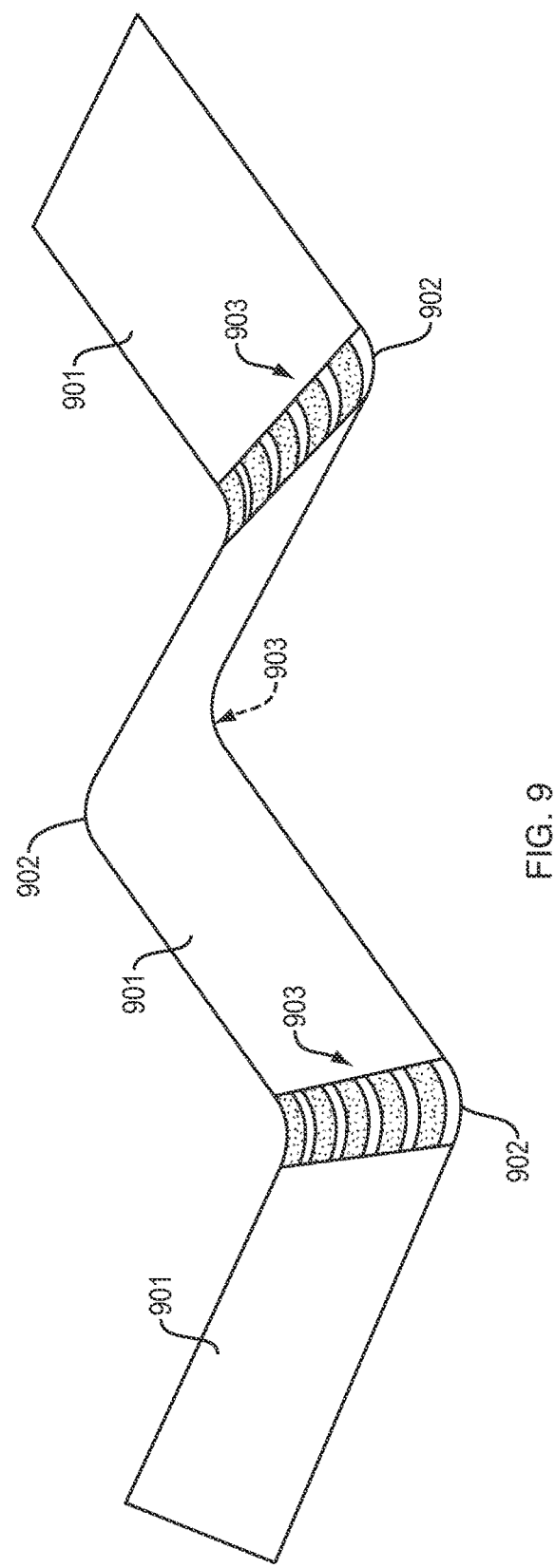
FIG. 9 shows a stiff substrate, with hygromorphic material applied to less rigid bending regions of the substrate.

FIG. 9 shows a stiff substrate 901, with hygromorphic material 903 applied to less rigid bending regions 902 of the substrate, in an illustrative embodiment of this invention. This structure causes angular (V-shaped) bending in the bending regions, in response to changes in ambient relative humidity.

In illustrative embodiments, the composite film is fabricated by solidifying a solution that includes hygromorphic material. The solution is applied onto a substrate layer and then solidified based on solvent evaporation, chemical reaction (including UV radiation), or solubility curing, but not limited to these methods.

Humidity Control

In some embodiments of this invention, relative humidity is controlled and rapidly adjusted, in order to rapidly adjust bending of hygromorphic materials.

Figure 10:
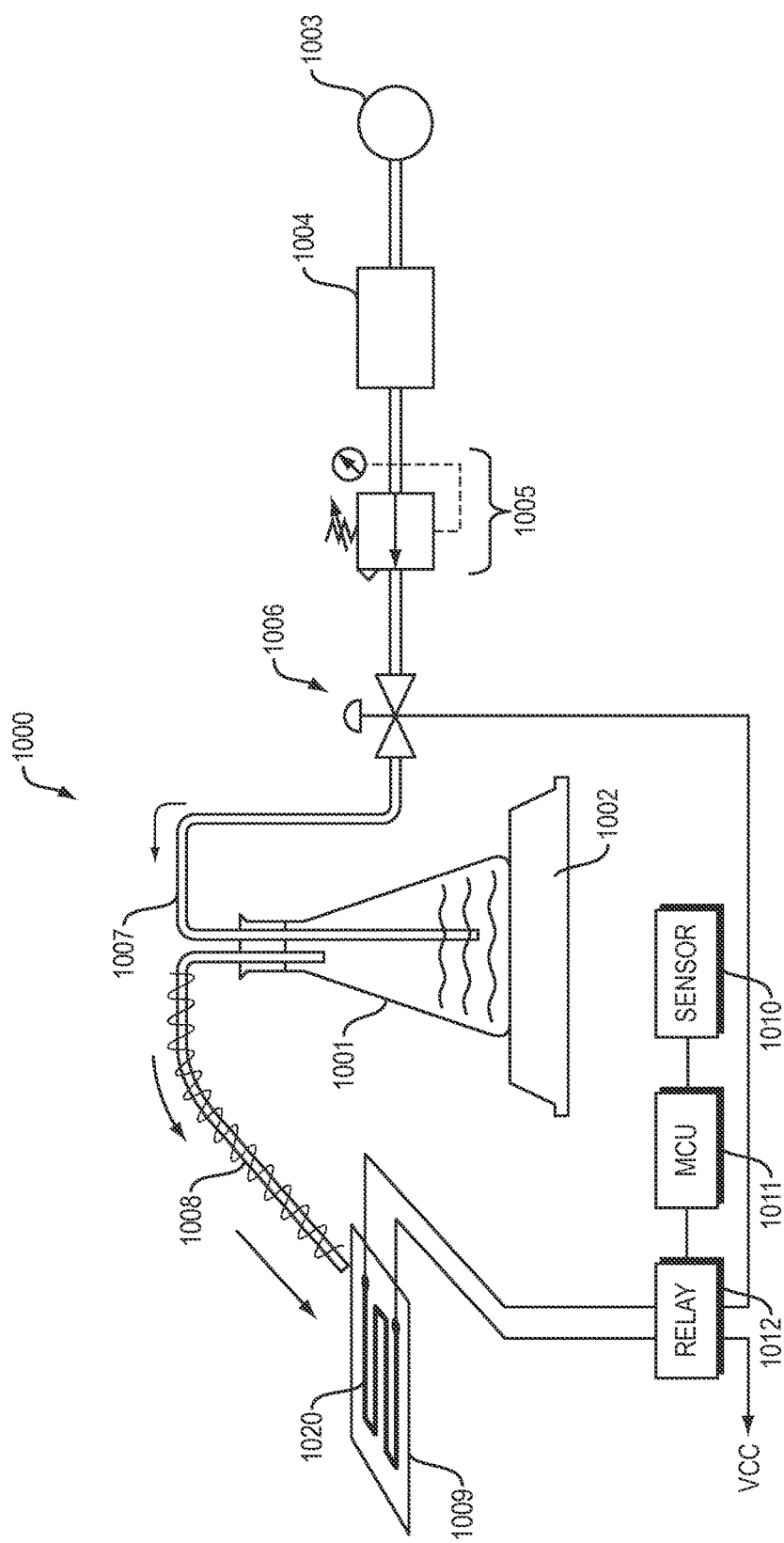
FIG. 10 shows a bubbler system for controlling relative humidity.

FIG. 10 shows a bubbler system 1000 for controlling relative humidity.

To quickly raise the relative humidity, a water bubbler 1001 converts dry, compressed air into wet air that reaches above 90% relative humidity. The dry, compressed air is compressed by an air compressor 1003, stored in a reservoir 1004, and delivered to the bubbler via a pressure regulator 1005, valve 1006 and pneumatic tubing 1007. A heater 1002 heats the liquid in bubbler 1001. Wet air travels via pneumatic tube 1008 to composite film 1009. The film changes shape in response to increases and decreases in relative humidity.

To quickly lower the relative humidity, conductive traces 1020 are included in the composite film 1009. When voltage is applied to the conductive traces, the heat generated by the traces raises the temperature around the composite film. This causes the relative humidity to decrease rapidly.

To alternate between high and low relative humidity, the system alternatively provides wet air from the bubbler, then applies a voltage to drive current through the conductive traces. A sensor 1010 detects relative humidity in the region of the composite film 1009. The sensor reads are transmitted to a microcontroller 1011. The microcontroller 1001 controls one or more relay switches 1012, which alternately turn on the bubbler and the voltage to the conductive traces. In some implementations, a complete cycle from humid to less humid to humid again takes less than one minute.

FIGS. 11A and 11B show a composite film with a conductive trace, in an illustrative embodiment of this invention. In FIGS. 11A and 11B, hygromorphic material 701 is selectively applied to one side 711 of a substrate 702, and conductive ink 1101 is selectively applied to the other side 710 of the substrate 702. The conductive ink is a resistive heater that generates heat when electric current flows through it. The heat to changes the ambient relative humidity and the composite film responds to the change by changing its bending angle.

Alternatively or in addition, the conductive trace 1101 may be used as sensing elements well. For example, in some cases, the resistance of the conductive traces changes as the composite film bends at varying curvatures. With precise calibration, the bending angle may be read directly. A single conductive trace may serve either as a capacitive sensor or heating element through the use of two relay switches.

FIG. 12A shows an exploded view of a mask system for selectively applying conductive ink, in an illustrative embodiment of this invention. FIG. 12B shows conductive ink being applied to a substrate, in an illustrative embodiment of this invention. A mask 1203 is placed over a mesh 1202, which is placed over a substrate 1200. A frame 1201 holds the mesh and mask in position. Conductive ink is dispensed by a dispenser 1210 onto the mask 1202. A squeegee 1211 presses the conductive ink through the mask, thereby depositing a conductive trace 1214 on the substrate.

Alternatively or in addition, a heating panel that is external to the composite film may provide heat to reduce relative humidity.

FIG. 13A shows a heating panel 1301 for heating a composite film 700, in an illustrative implementation of this invention. FIG. 13B shows a cross-section of the heater. The heating panel 1301 comprises resistive heating wires 1302 between two layers of material 1303, 1304 that are not damaged by heat. The heat generated by the wires 1302 decreases the environmental relative humidity and result in the bending of the composite film 700 on top of it.

Hygromorphic Shape Control

In illustrative embodiments of this invention, the bending orientation of a composite film depends in part on the orientation of the cell deposition. Parallel lines of cell films tend to pull the film such that the film bends along the longitude of the lines.

FIGS. 14A-14D show two bending primitives, in which bending is actuated by hygromorphic material, in illustrative embodiments of this invention. A composite film comprises (a) a substrate layer 1403 that is not responsive to relative humidity, and (b) a layer of hygromorphic material 1402 that expands and contracts in response to changes in relative humidity.

Figure 14A:
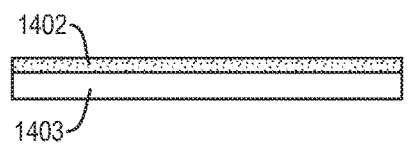
FIGS. 14A-14D show two bending primitives, in which bending is actuated by hygromorphic material.
Figure 14B:
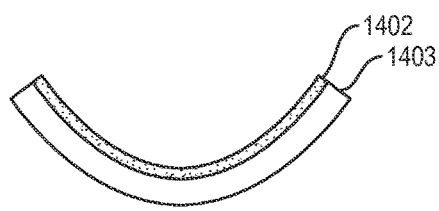

In FIG. 14A and FIG. 14B, the bending primitive is a smooth rounded curve. To achieve a smooth curve transformation, hygromorphic material is applied across an entire side of the elastic substrate. The bending curvature of the smooth curve at a specific relative humidity depends on the thicknesses of both hygromorphic layer and substrate layer, the coverage percentage on the substrate, and type of the hygromorphic material.

Figure 14C:
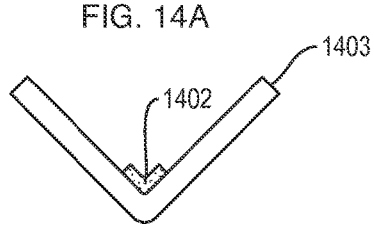
Figure 14D:
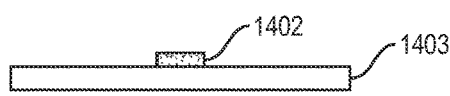

In FIG. 14C and FIG. 14D, the bending primitive is V-shaped. To achieve V-shaped bend (a sharp angular bend), hygromorphic material is applied in the folding line area on top of substrate. A stiffer material itself can be used as a single substrate (hygromorphic materials on the line area) or a stiffer material without hygromorphic material may be attached to the soft substrate regions with hygromorphic material, to stabilize the structure and enhance the effect of a sharp fold. The bending angle of a V-shaped bend (a sharp angular bend) is determined by the thicknesses of both hygromorphic layer and the substrate layer, the coverage percentage on the substrate line area, and type of the hygromorphic material.

The amount of change in relative humidity needed to reach this bending angle (i.e., the sensitivity of the bending response) depends on the thickness of the deposited hygromorphic layer, the coverage percentage on the substrate line area, and type of the hygromorphic material.

These two bending primitives (smooth curve and V-shaped sharp angular bend) may be combined to create a variety of shape transformations including 1D linear transformation, 2D surface expansion and contraction, 2.5D texture change and 3D folding. In illustrative embodiments of this invention, these shape transformations are actuated by expansion and contraction of hygromorphic material in response to changes in relative humidity.

Figure 14E:
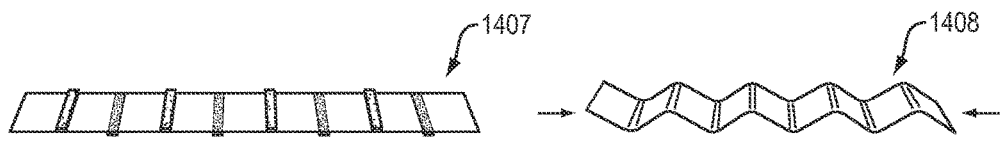
FIGS. 14E-14V show examples of shape transformations that comprise a combination of these two bending primitives In FIG. 14E and FIG. 14F, the transformation is to and from a zig-zag shape.
Figure 14F:
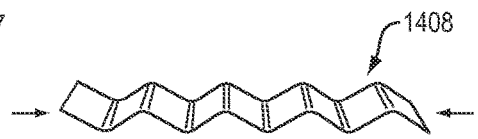
Figure 14G:
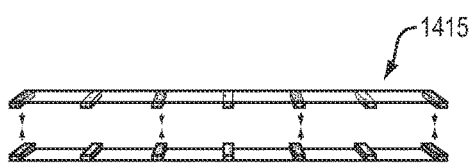
Figure 14H:
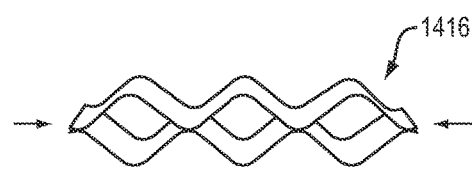
Figure 14I:
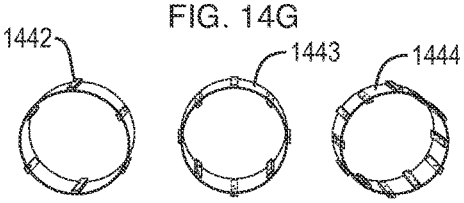
In FIG. 14I and FIG. 14J, the transformation is to and from a three-, four- or five-pointed polygon.
Figure 14J:
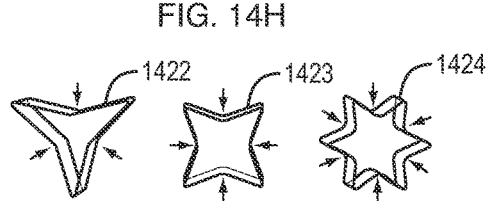
Figure 14K:
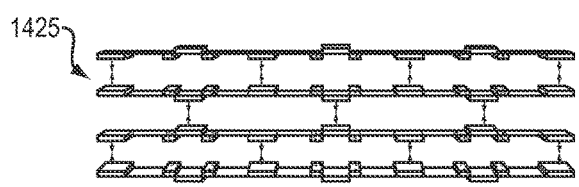
In FIG. 14K and FIG. 14L, the transformation is to and from a honeycomb shape.
Figure 14L:
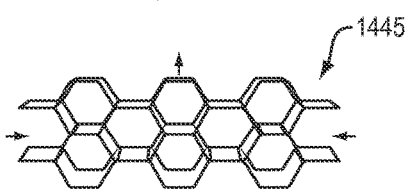
Figure 14M:
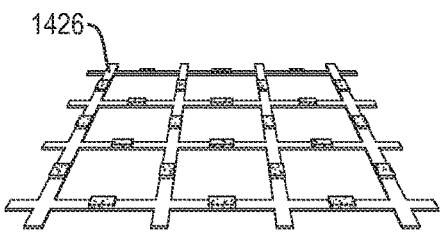
In FIG. 14M and FIG. 14N, the transformation changes surface texture between flat and undulatory.
Figure 14N:
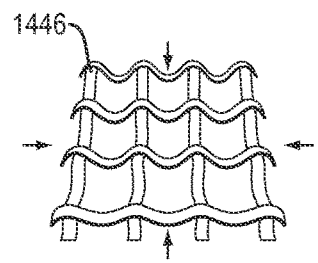
Figure 14O:
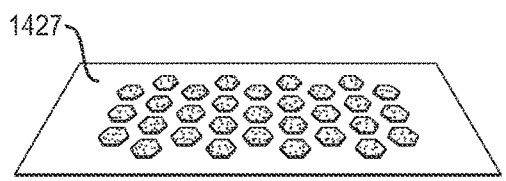
In FIG. 14O and FIG. 14p, the transformation changes surface texture between flat and bumpy.
Figure 14P:
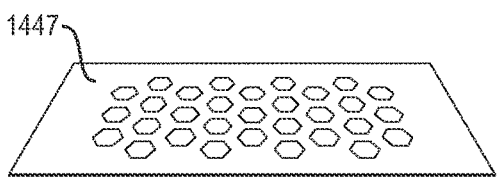
Figure 14Q:
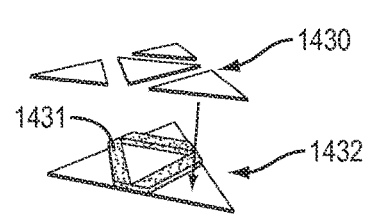
Figure 14R:
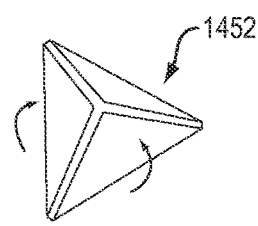
Figure 14S:
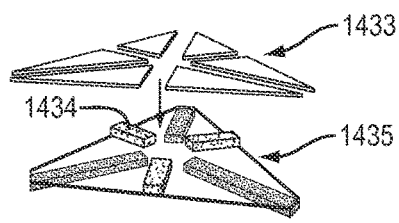
Figure 14T:
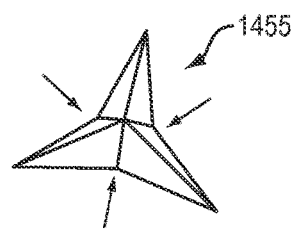
Figure 14U:
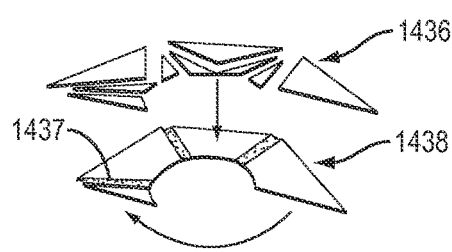
Figure 14V:
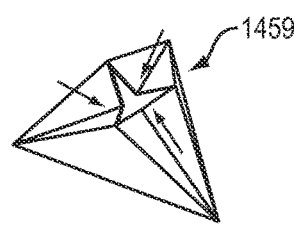

FIGS. 14E-14V show examples of shape transformations that comprise a combination of these two bending primitives, in illustrative embodiments of this invention.

In some cases, the shape transformation changes the shape of a single panel. In FIG. 14E and FIG. 14F, a single panel changes shape between a flat shape 1407 and a zig-zag shape 1408. In FIG. 14G and FIG. 14H, a single panel changes shape between (a) a flat structure 1415 and (b) an accordion-like shape 1416.

In some cases, the shape transformation is two-dimensional. In FIG. 1I and FIG. 14J, the transformation is between circular shapes 1442, 1443, 1444 and a three-pointed polygon 1422, a four-pointed polygon 1423, and a five-pointed polygon 1424, respectively. In FIG. 14K and FIG. 14L, the transformation is between flat layers 1425 to a honeycomb shape 1445.

In some cases, the shape transformation changes surface texture. In FIG. 14M and FIG. 14N, the transformation is between a flat surface 1426 and an undulatory surface 1446. In FIG. 14O and FIG. 14P, the transformation is between a flat surface 1427 and a bumpy surface 1447.

In some cases, the shape transformation comprises 3D folding or 3D unfolding. In FIGS. 14Q and 14R, five separate pieces of rigid substrate 1430 are attached to hygromorphic material 1431 to form a flat shape 1432. Hygromorphic actuation changes this flat shape 1432 into a 3D folded shape 1452, and vice versa. Likewise, in FIGS. 14S and 14T, six separate pieces of rigid substrate 1433 are attached to hygromorphic material 1434 to form a flat shape 1435. Hygromorphic actuation changes this flat shape 1435 into a 3D folded shape 1455, and vice versa. Similarly, in FIGS. 14U and 14V, multiple separate pieces of rigid substrate 1436 are attached to hygromorphic material 1437 to form a flat shape 14338. Hygromorphic actuation changes this flat shape 1435 into a 3D folded shape 1459, and vice versa.

In some embodiments of this invention, hygromorphic material is used to change the geometry of a fabric. In some cases, hygromorphic material is deposited on a certain region within a thread matrix. When the hygromorphic material shrinks into smaller volume at low relative humidity, both the length and diameter of the thread decreases. The threads may be interwoven, such that a decrease in relative humidity causes a woven region to change shape to have a smaller space between threads. Similarly, a spring shape of a thread may expand or contract if treated by hygromorphic material. If hygromorphic material is applied to only one side of a thread, then the thread tends to bend.

FIG. 15A-15J show hygromorphic material attached to threads in a textile, in an illustrative embodiment of this invention. The hygromorphic material expands in response to an increase in relative humidity, and contracts in response to a decline in relative humidity.

Figure 15A:
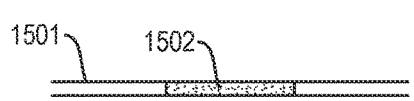
FIG. 15A-15K show hygromorphic material attached to threads in a textile.
Figure 15B:

FIG. 15A and FIG. 15B show hygromorphically-actuated expansion and contraction of a portion of a single thread. The thread 1501 includes a region 1502 where the hygromorphic material has been applied.

Figure 15C:
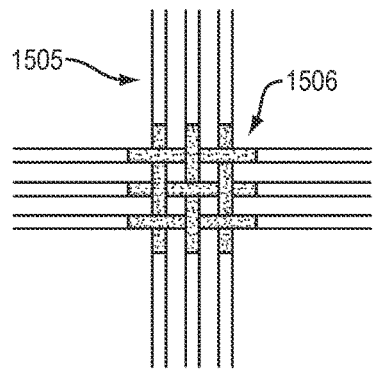
Figure 15D:
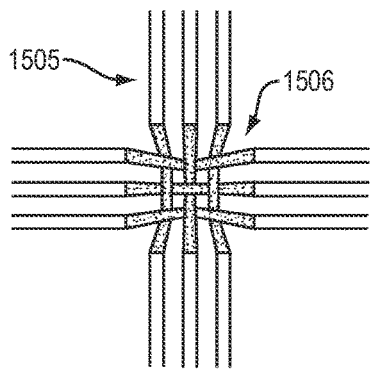

FIG. 15C and FIG. 15D show hygromorphically-actuated expansion and contraction of plain-woven threads 1505. The interwoven threads 1505 include a region 1506 where the hygromorphic material has been applied.

Figure 15E:
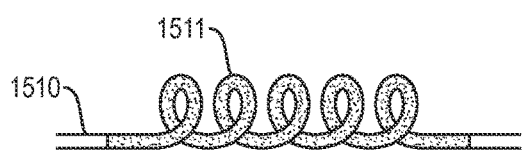
Figure 15F:
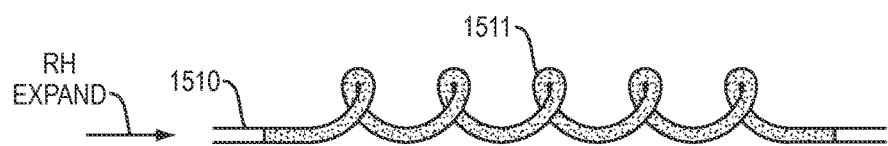

FIG. 15E and FIG. 15F show hygromorphically-actuated expansion and contraction of spiral loops of a thread. The thread 1510 includes a region 1511 where the hygromorphic material has been applied.

Figure 15G:
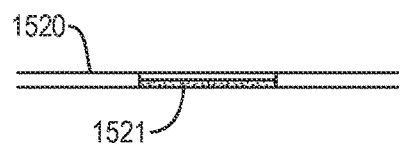
Figure 15H:
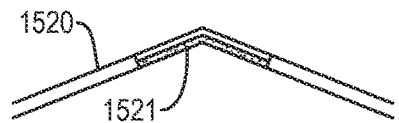

FIG. 15G and FIG. 15H show hygromorphically-actuated expansion and contraction of hygromorphic material in a lower region 1521 of a thread 1520. The transformation changes the thread shape between flat and "V" shaped.

Figure 15I:
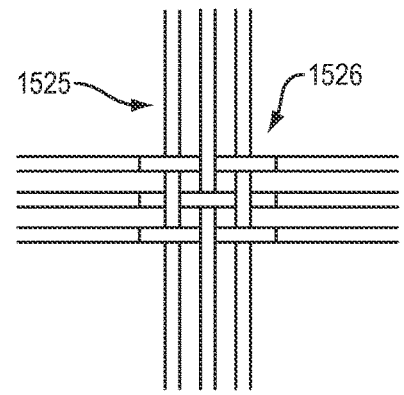
Figure 15J:
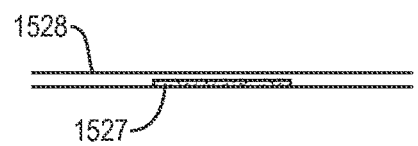
Figure 15K:
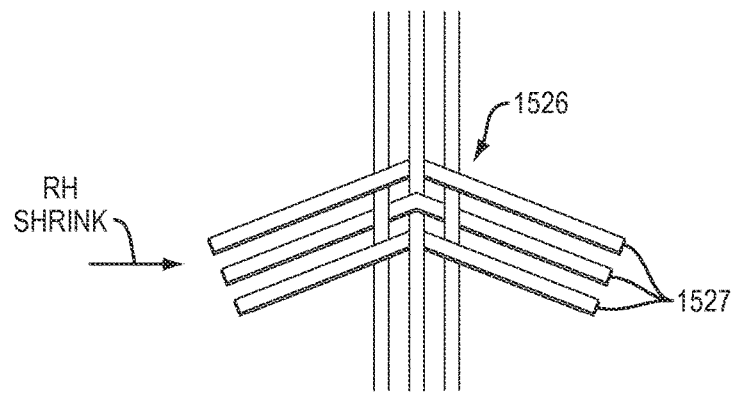

FIG. 15I, 15J and FIG. 15K show hygromorphically-actuated expansion and contraction of plain-woven threads 1525. The hygromorphic material is applied only to lower regions (e.g., 1527) of threads (e.g, 1528), and only in area

1526. The transformation changes the weave shape between plain weave (i.e., criss-cross at 90 degree angle) and bent.

Figure 16A:
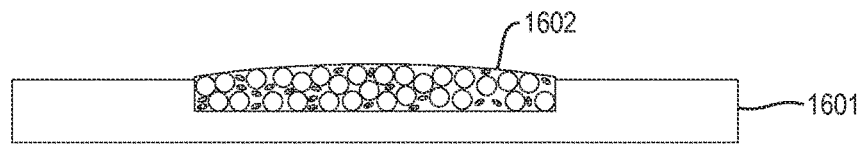
FIGS. 16A-16H show hygromorphically-actuated expansion and contraction of a composite film that comprises liquid latex and cells and, in some cases, other materials.
Figure 16B:
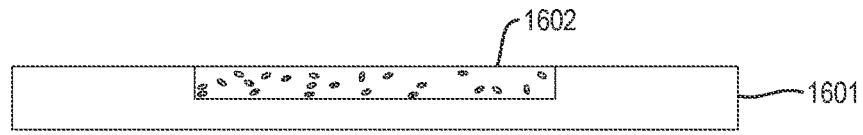
Figure 16C:
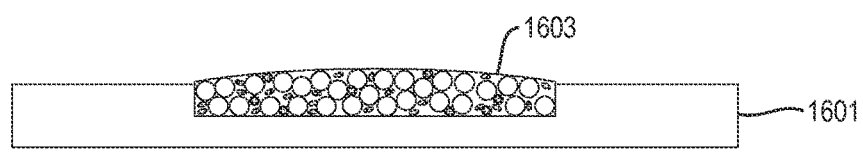

FIGS. 16A-16H show hygromorphically-actuated expansion and contraction of a composite film, in an illustrative embodiment of this invention. The composite film comprises liquid latex and cells and, in some of the Figures, other materials. In FIGS. 16A, 16C, 16E, 16G, humidity is higher and hygromorphic material are in an expanded state. In FIGS. 16B, 16CD, 16F, 16H, humidity is lower and hygromorphic material are in a contracted state.

In FIGS. 16A-16H, a heating container 1601 holds a composite that includes hygromorphic material. For example, the hygromorphic material may comprise living cells.

The heating container 1601 includes a heater. In some cases: (a) container 1601 provides heat that speeds evaporation of liquid from the solution that is deposited by the LDM 3D printer; (b) the evaporation causes the deposited material to solidify. For example, in some cases, the liquid solution that is deposited by the LDM comprises liquid latex, cells and other functional materials (e.g., dyes, nanoparticles, etc) that were premixed before pouring into the heating container on top of a hotplate. Water is evaporated during heating process and a thin film is formed. As the liquid latex has a higher viscosity, no mixing or stirring is needed during the evaporation process.

In FIGS. 16A and 16B, the composite 1602 comprises liquid polymer precursor and hygromorphic material represented by circles and ovals.

Figure 16D:
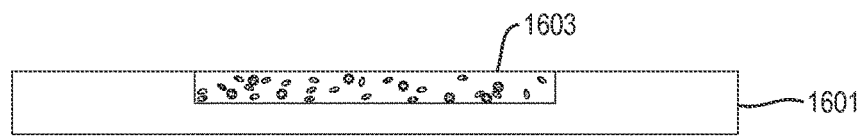

In FIGS. 16C and 16D, the composite 1603 comprises liquid polymer precursor and hygromorphic material (represented by circles and ovals) and magnetic nanoparticles (symbolized by small black circles).

Figure 16E:
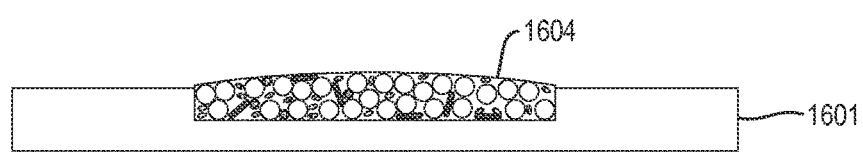
Figure 16F:
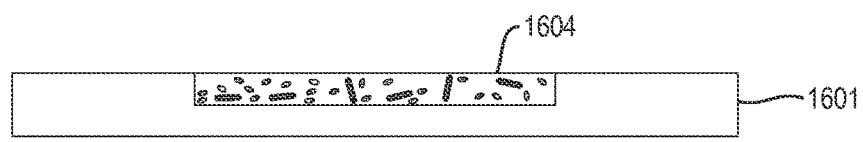

In FIGS. 16E and 16F, the composite 1604 comprises liquid polymer precursor and hygromorphic material (represented by circles and ovals), and nanowires (symbolized by dark rods).

Figure 16G:
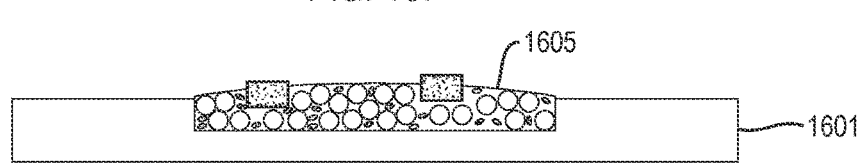
Figure 16H:
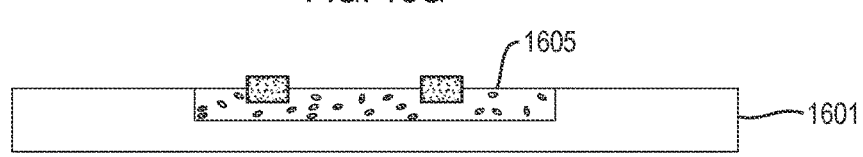

In FIGS. 16G and 16H, the composite 1605 comprises liquid polymer precursor and hygromorphic material (represented by circles and ovals), and sensors (symbolized by rectangles).

Hygromorphic Materials

In illustrative implementations, any type of hygromorphic material nay be employed. For example, in some cases, the hygromorphic material comprises living cells or cell debris, including bacterial cells, such as gram positive bacteria and gram negative bacteria, fungi cells (including yeast cells), mammalian cells, or cellular components including protein, DNA, carbohydrate (including polysaccharide) or their mixtures. For example, the hygromorphic material may comprise vegetative or endospore cells of any bacteria, including *Bacillus* sp.

For example, in some cases, the hygromorphic material comprises vegetative *Bacillus subtilis* natto cells. Natto cells are relative humidity responsive actuators. Natto cells may be suspended in water, and deposited onto latex to form composite thin films upon water evaporation. In some embodiments of this invention, the LDM 3D printer deposits a solution of water and natto cells. The solution of natto cells and water is stored in a gravity-feed solution container. The solution is then dispensed through liquid dispenser 121. A ventilation module as well as the heating plate module are used to speed up evaporation of liquid from the deposited solution.

In some cases, the hygromorphic material comprises chemical curable hydrogels such as calcium alginate based hydrogels. The liquid sodium alginate solution may form gel when it meets calcium solution. The gel forms due to the replacement of alginate iron with calcium iron when the two liquid solution meets each other. In some cases, the LDM printer uses dispenser 121 to deposit a thin line of liquid alginate, then uses the pneumatically controlled container module with a Luer fitting brush tip to deposit calcium solution following the same printing path. Gel forms immediately as the brush passes by the liquid alginate lines. 3D structures may be formed layer by layer.

In some cases, the hygromorphic material comprises UV curable hydrogel. Hydrogel swells in water. In some embodiments of this invention, the hygromorphic material solution is poly(ethylene glycol) di(meth)acrylate (PEGDA), a UV curable hydrogel. In its gel phase, it swells more than 40% when submerged in water. The formation of the hydrogel is triggered by UV radiation, where free radicals are released from the initiator, resulting in cross-linking of the gels. The pre-polymer solidifies within 10 seconds when high intensity and focused UV light is applied. In some cases, the LDM printer uses the dispenser 121 and the UV lamp 146 to print the hydrogel.

In addition, in some cases, thermochromic powder (a) is included in the composite film; and (b) the composite film changes colors with temperature.

Use Cases

Figure 17A:
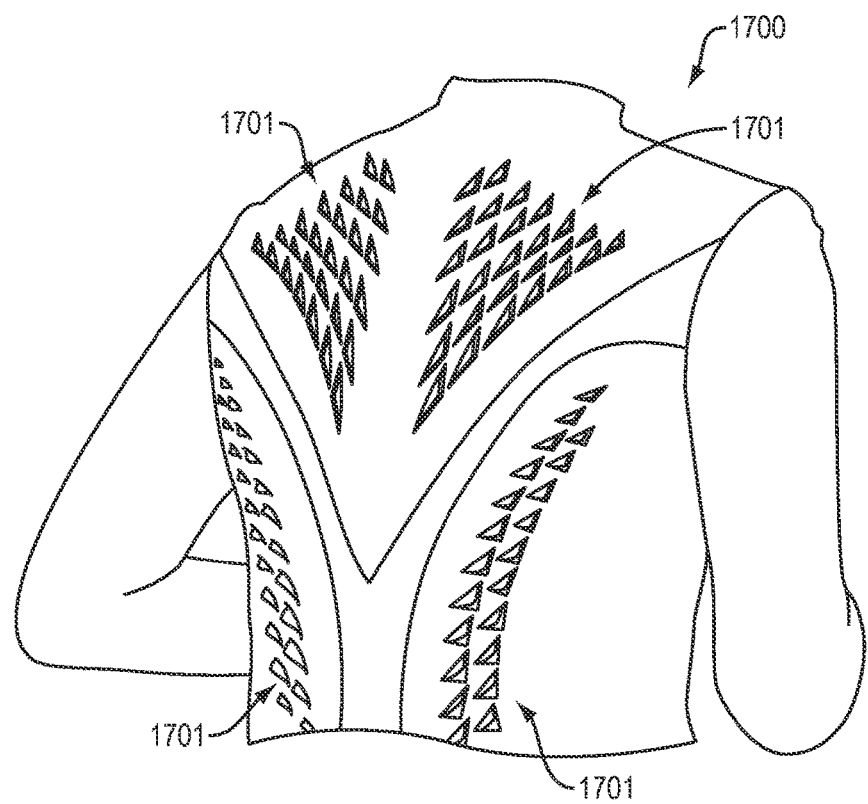
FIGS. 17A, 17B and 17C show a running suit with hygromorphically-actuated vents.
Figure 17B:
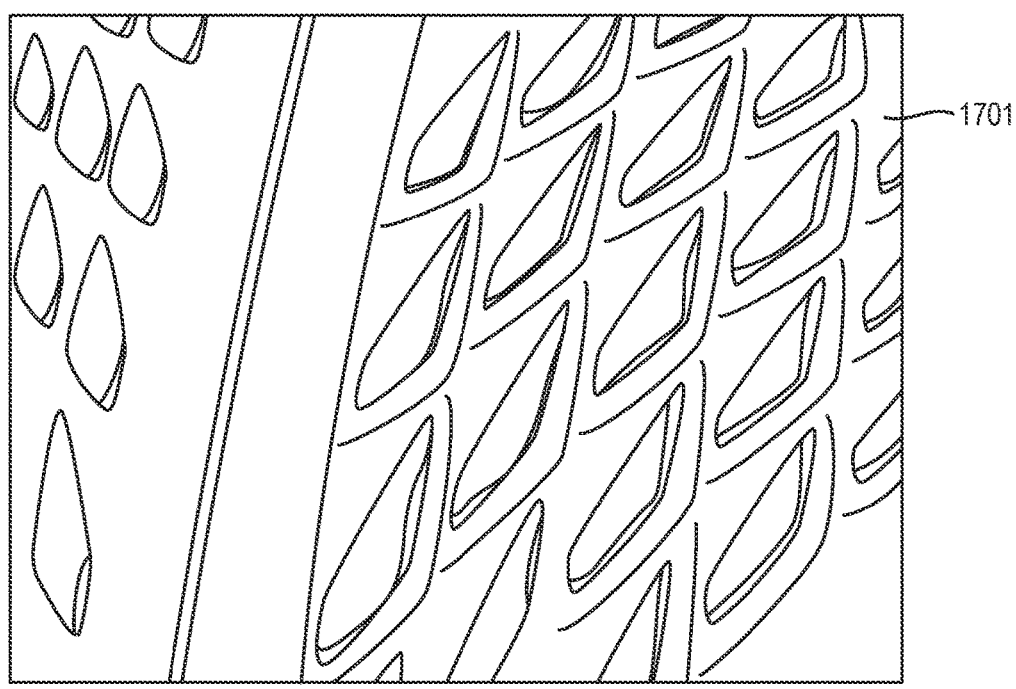
Figure 17C:
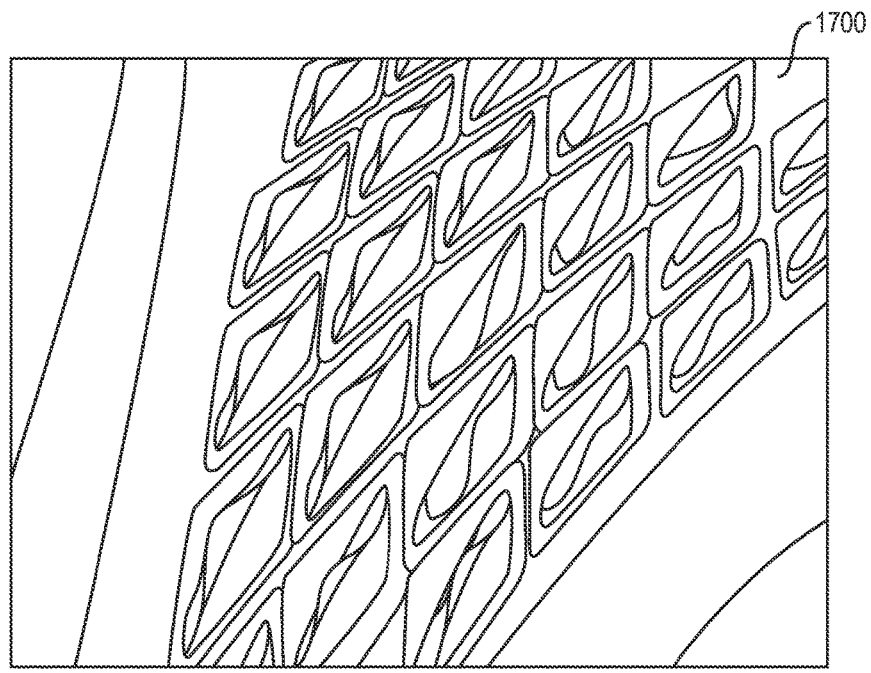

This invention has many practical applications. Here are some non-limiting examples:

A composite film that includes hygromorphic material may be used to construct sweat-responsive textile for a breathable sports garment. FIGS. 17A, 17B and 17C show a running suit 1700 with hygromorphically-actuated vents 1701, in an illustrative embodiment of this invention. The suit is powered by and responds to the user's sweat resulting opening of the vents, to cool down the runner. FIG. 17A shows the region of the suit worn on the runner's back. In FIG. 17B, the relative humidity is low, the hygromorphic material is contracted and the force on the tri-layer film is balanced, and vents 1701 are closed shut. In FIG. 17C, the relative humidity towards skin is high (due to runner's sweat), the hygromorphic material is expanded, and the force by the contraction of hygromorphic materials exposed to the environment dominates, and vents 1701 are open.

Figure 18:
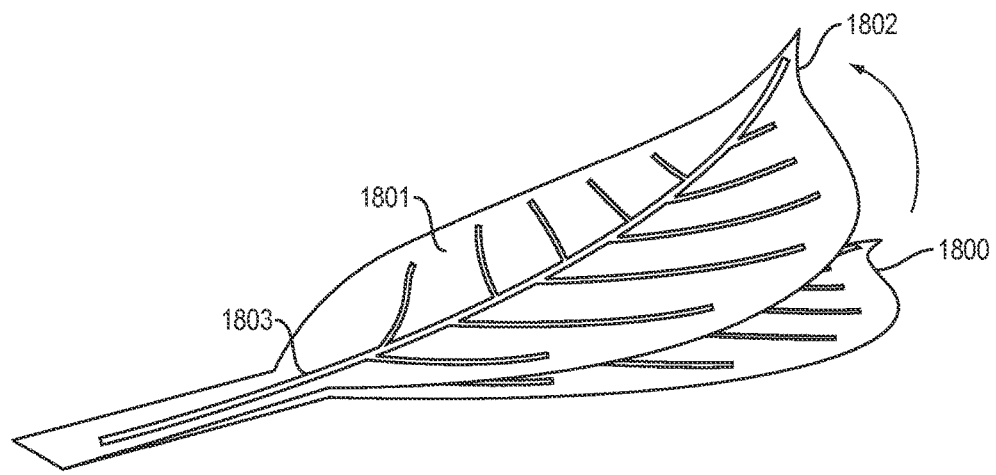
FIG. 18 shows hygromorphic material applied to the "veins" of a leaf-shaped substrate.

FIG. 18 shows hygromorphic material applied to form the "veins" 1803 on a leaf-shaped substrate 1801. The biomemetic leaf-shaped object changes in shape between flat 1800 and curved 1802, in response to changes in relative humidity.

The film may be used as micro-actuators to activate microstructures. For example, it may be used to design micro-valves that may be activated by moisture. One application is a moisture responsive toothbrush with integrated micro-valves that may mix chemical components (e.g. to produce hydrogen peroxide for whitening) only when the toothbrush is placed into a human mouth.

Also, a composite film that includes hygromorphic material may be used: (a) as covers for pills, which covers change shape in response to liquid in the mouth or digestive system; (b) in a sweat- or moisture-responsive home textile, such as bed sheets, pillow cover, wall paper, curtain and blanket; (c) in moisture-responsive toys that may be actuated by either heating or human breath; and (d) in moisture-responsive health care products, including facials, toothbrush; (e) in moisture supplying products or food, including body creams, soap bars, ice creams etc.

In some cases, a composite film that includes hygromorphic material may be used for a "Living Teabag". In this example, the leaf on top of the tea bag is curled up in the beginning After pouring hot water into the teacup, the curled leaf slowly unwraps to indicate the tea bag is fully soaked in water. Once the tea is ready and the tea bag is pulled out of the cup, the leaf curls up again to indicate the end of its life. The unwrapping may be triggered by either the steam coming from the hot water, or the capillary force that comes all the way up from the tea bag. Since the length and timing of the capillary movement is controllable, the leaf's unwrapping may more precisely indicate the timing of when tea is ready.

In some cases, the hygromorphic material is used to actuate a tiny drug delivery apparatus.

Computers

In exemplary implementations of this invention, one or more electronic computers (e.g. 111, 505, 506, 1011) are programmed and specially adapted: (1) to control the operation of, or interface with, hardware components of a 3D printing system; (2) to control the operation of, or interface with, hardware components of a bubbler system; (3) to perform any other calculation, computation, program, algorithm, or computer function described or implied above; (4) to receive signals indicative of human input; (5) to output signals for controlling transducers for outputting information in human perceivable format; and (6) to process data, to perform computations, to execute any algorithm or software, and to control the read or write of data to and from memory devices (items 1-6 of this sentence referred to herein as the "Computer Tasks In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Definitions

The terms "a" and "an", when modifying a noun, do not imply that only one of the noun exists.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

"Herein" means in this document, including text, specification, claims, abstract, and drawings.

The "hygromorphology" of an object means the set of changes in shape that the object would undergo in response to changes in ambient relative humidity.

A "hygromorphic" material means a material that expands in response to an increase in relative humidity and that contracts in response to a decrease in relative humidity.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O device" means an input/output device. Non-limiting examples of an I/O device include any device for (a) receiving input from a human user, (b) providing output to a human user, or (c) both. Non-limiting examples of an I/O device also include a touch screen, other electronic display screen, keyboard, mouse, microphone, handheld electronic game controller, digital stylus, display screen, speaker, or projector for projecting a visual display.

As used herein, water or an aqueous solution in liquid form shall be treated as having a relative humidity of 100%. For example, if a dry object surrounded by air with 10% relative humidity is suddenly immersed in a bucket of water, then the object is treated as being exposed to an increase in relative humidity.

The term "or" is inclusive, not exclusive. For example A or B is true if A is true, or B is true, or both A or B are true.

Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, the term "set" does not include a group with no elements. Mentioning a first set and a second set does not, in and of itself, create any implication regarding whether or not the first and second sets overlap (that is, intersect).

"Sharply angled bend" means a region of a surface, which region includes a curve that is positioned between and touches two planar areas of the region.

"Smooth curve" means a region of a surface, which region is continuously curved but is not divided into several tangible flat surfaces.

"Some" means one or more.

As used herein, a "subset" of a set consists of less than all of the elements of the set.

"Substantially" means at least ten percent. For example: (a) 112 is substantially larger than 100; and (b) 108 is not substantially larger than 100. For example, a "substantially planar region" means a region for which there exists a direction, such that all surface normals to the region are within 10 degrees of the direction.

The term "such as" means for example.

"3D printer" means an apparatus for depositing material, according to computer instructions, which apparatus includes a 3-axis positioning system, actuators for the positioning system, and an orifice through which material is ejected.

To say that a machine-readable medium is "transitory" means that the medium is a transitory signal, such as an electromagnetic wave.

To say that a bacterial cell is "vegetative" means that the cell is living but is not in endospore dormant phase.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, the Applicant or Applicants are acting as his, her, its or their own lexicographer.

Variations

This invention may be implemented in many different ways. Here are some non-limiting examples:

In one aspect, this invention is a method comprising applying hygromorphic material to a first side of an object, such that: (a) the amount of the hygromorphic material that adheres to the first side varies substantially from region to region of the first side; (b) the hygromorphic material adheres in a first spatial distribution on the first side of the object, which first spatial distribution is the amount of hygromorphic material adhering to the first side as a function of spatial position; and (c) the hygromorphology of the object, after the applying, depends at least in part on the first spatial distribution. In some cases, the hygromorphology includes changing from a state in which the shape of the object does not include a sharply angled bend to a state in which the shape of the object includes a sharply angled bend. In some cases, the hygromorphic material comprises a hydrogel. In some cases, the hygromorphic material comprises a bacterial cell. In some cases, the method further comprises adjusting relative humidity ambient to the object, and thus causing a change in shape of the object. In some cases, the adjusting of relative humidity comprises increasing moisture content at some times and decreasing moisture content at other times, wherein: (a) the increasing comprises increasing relative humidity of air ambient to the first side; and (b) the decreasing comprises evaporation caused by resistive electrical heating. In some cases, the resistive electrical heating occurs in conductive material that is part of the object. In some cases: (a) the method further comprises applying hygromorphic material to a second side of the object, which side is different than the first side, such that the amount of hygromorphic material that adheres to the second side varies substantially from region to region of the second side; (b) the hygromorphic material adheres in a second spatial distribution on the second side of the object, which second spatial distribution is the amount of hygromorphic material adhering to the second side as a function of spatial position; and (c) the hygromorphology of the object, after the applying described in clause (b) of this claim 9, depends at least in part on the second spatial distribution. Each of the cases described above in this paragraph is an example of the method described in the first sentence of this paragraph, and is also an example of an embodiment of this invention that may be combined with other embodiments of this invention.

In another aspect, this invention is a method comprising: (a) applying hygromorphic material to a first side of an object, such that the amount of the hygromorphic material that adheres to the first side varies substantially from region to region of the first side; and (b) applying hygromorphic material to a second side of an object, such that the amount of the hygromorphic material that adheres to the second side varies substantially from region to region of the second side; wherein the first and second sides are different from each other. In some cases, the applying of hygromophic material to the first and second sides is such that, after the applying, the object would undergo a bending movement if the object were to be simultaneously exposed to a first relative humidity on the first side and a second relative humidity on the second side, the first and second relative humidities being different from each other. In some cases, the bending movement would include changing from a state in which the shape of the object does not include a sharply angled bend to a state in which the shape of the object includes a sharply angled bend. Each of the cases described above in this paragraph is an example of the method described in the first sentence of this paragraph, and is also an example of an embodiment of this invention that may be combined with other embodiments of this invention.

In another aspect, this invention is an apparatus comprising (a) a 3D printer for applying hygromorphic material to a first side of an object, such that the amount of the hygromorphic material that adheres to the first side varies substantially from region to region of the first side; and (b) one or more heaters and humidifiers for varying the relative humidity that is ambient to the object, and thus causing a change in shape of the object, which change of shape follows a bending pattern, which bending pattern depends, at least in part, on a distribution of the hygromorphic material on the first side, which distribution is the amount of hygromorphic material adhering to the first side as a function of spatial position on the first side. In some cases, the bending pattern comprises a sharply angled bend. In some cases, the bending pattern comprises a smooth curve. In some cases, the bending pattern comprises a change in surface texture. In some cases, the heater comprises a resistive material. In some cases: (a) the printer is also configured for applying a hygromorphic material to a second side of the object, which side is different than the first side, such that the amount of the hygromorphic material that adheres to the second side varies substantially from region to region of the second side; and (b) the bending pattern also depends, at least in part, on a second distribution of the hygromorphic material on the second side, which second distribution is the amount of hygromorphic material adhering to the second side as a function of spatial position on the second side. Each of the cases described above in this paragraph is an example of the apparatus described in the first sentence of this paragraph, and is also an example of an embodiment of this invention that may be combined with other embodiments of this invention.

In another aspect, this invention is an article of manufacture that (a) includes hygromorphic material that adheres to a first side of the article, such that the amount of the hygromorphic material that adheres to the first side varies substantially from region to region of the first side; and (b) includes hygromorphic material that adheres to a second side of the article, such that the amount of the hygromorphic material that adheres to the second side varies substantially from region to region of the first side; wherein, the distribution of hygromorphic material adhering to the first and second sides is such that when a change in relative humidity ambient to the object occurs, this change in relative humidity causes a change in shape of the object, which change of shape follows a bending pattern, which bending pattern includes forming a sharply angled bend. In some cases, the article comprises a textile fabric. In some cases, the article includes a resistive heater. Each of the cases described above in this paragraph is an example of the article of manufacture described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. A method comprising applying hygromorphic material to a first side of an object, in such a manner that:
   (a) the amount of the hygromorphic material that adheres to the first side varies substantially from region to region of the first side;
   (b) the hygromorphic material adheres in a first spatial distribution on the first side of the object, which first spatial distribution is the amount of hygromorphic material adhering to the first side as a function of spatial position; and
   (c) the hygromorphology of the object, after the applying (i) depends at least in part on the first spatial distribution, and (ii) includes changing from a state in which the shape of the object does not include a sharply angled bend to a state in which the shape of the object includes a sharply angled bend.

2. The method of claim 1, wherein the hygromorphic material comprises a hydrogel.

3. The method of claim 1, wherein the hygromorphic material comprises a bacterial cell.

4. The method of claim 1, wherein the method further comprises adjusting relative humidity ambient to the object, and thus causing a change in shape of the object.

5. The method of claim 4, wherein the adjusting of relative humidity comprises increasing moisture content at some times and decreasing moisture content at other times, wherein:
   (a) the increasing comprises increasing relative humidity of air ambient to the first side; and
   (b) the decreasing comprises evaporation caused by resistive electrical heating.

6. The method of claim 5, wherein the resistive electrical heating occurs in conductive material that is part of the object.

7. The method of claim 1, wherein:
   (a) the method further comprises applying hygromorphic material to a second side of the object, which side is different than the first side, in such a manner that the amount of hygromorphic material that adheres to the second side varies substantially from region to region of the second side;
   (b) the hygromorphic material adheres in a second spatial distribution on the second side of the object, which second spatial distribution is the amount of hygromorphic material adhering to the second side as a function of spatial position; and
   (c) the hygromorphology of the object, after the applying to the second side, depends at least in part on the second spatial distribution.

8. A method comprising:
   (a) applying hygromorphic material to a first side of an object, in such a manner that the amount of the hygromorphic material that adheres to the first side varies substantially from region to region of the first side; and
   (b) applying hygromorphic material to a second side of an object, in such a manner that the amount of the hygromorphic material that adheres to the second side varies substantially from region to region of the second side; and (c) bending of the object in response to a change in relative humidity, which bending includes changing from a state in which the shape of the object does not include a sharply angled bend to a state in which the shape of the object includes a sharply angled bend;

wherein the first and second sides are different from each other.

9. The method of claim 8, wherein the bending occurs when the object is simultaneously exposed to a first relative humidity on the first side and to a second relative humidity on the second side, the first and second relative humidities being different from each other.

* * * * *